US006639152B2

(12) United States Patent
Glew et al.

(10) Patent No.: US 6,639,152 B2
(45) Date of Patent: Oct. 28, 2003

(54) HIGH PERFORMANCE SUPPORT-SEPARATOR FOR COMMUNICATIONS CABLE

(75) Inventors: Charles A. Glew, Framingham, MA (US); Kevin F. Buchanan, Old Saybrook, CT (US)

(73) Assignee: Cable Components Group, LLC, Framingham, MA (US)

(*) Notice: Subject to any disclaimer, the term of this patent is extended or adjusted under 35 U.S.C. 154(b) by 0 days.

(21) Appl. No.: 09/939,375

(22) Filed: Aug. 25, 2001

(65) Prior Publication Data

US 2003/0037955 A1 Feb. 27, 2003

(51) Int. Cl.⁷ ................................................ H01B 7/00
(52) U.S. Cl. .................................................. 174/113 C
(58) Field of Search ..................... 174/110 R, 113 R, 174/113 C, 116, 113 AS, 36

(56) References Cited

U.S. PATENT DOCUMENTS

| | | | |
|---|---|---|---|
| 3,819,443 A | | 6/1974 | Simons et al. |
| 4,389,088 A | * | 6/1983 | Trezequet ................... 385/111 |
| 4,778,246 A | | 10/1988 | Carroll |
| 4,892,442 A | * | 1/1990 | Shoffner ................... 405/183.5 |
| 5,418,878 A | | 5/1995 | Sass et al. |
| 5,519,173 A | | 5/1996 | Newmoyer et al. |
| 5,544,270 A | | 8/1996 | Clark et al. |
| 5,574,250 A | | 11/1996 | Hardie et al. |
| 5,767,442 A | | 6/1998 | Eisenberg et al. |
| 5,789,711 A | | 8/1998 | Gaeris et al. |
| 5,808,239 A | | 9/1998 | Olsson |
| 5,825,101 A | | 10/1998 | Konig |
| 5,883,334 A | | 3/1999 | Newmoyer et al. |
| 5,939,679 A | | 8/1999 | Olsson |
| 5,952,615 A | | 9/1999 | Prudhon |
| 5,969,295 A | | 10/1999 | Boucino et al. |
| 6,010,788 A | | 1/2000 | Kebabjian et al. |
| 6,074,503 A | | 6/2000 | Clark et al. |
| 6,091,025 A | * | 7/2000 | Cotter et al. ............. 174/110 R |
| 6,124,551 A | | 9/2000 | Mattos et al. |
| 6,140,587 A | | 10/2000 | Sackett |
| 6,150,612 A | | 11/2000 | Grandy et al. |
| 6,169,251 B1 | | 1/2001 | Grant et al. |
| 6,248,954 B1 | * | 6/2001 | Clark et al. ............. 174/113 R |
| 6,297,454 B1 | * | 10/2001 | Gareis ..................... 174/113 C |
| 6,365,836 B1 | * | 4/2002 | Blouin et al. ........... 174/113 C |
| 6,379,175 B1 | * | 4/2002 | Reede ........................ 439/418 |

FOREIGN PATENT DOCUMENTS

| | | | |
|---|---|---|---|
| JP | 404332406 A | * 11/1992 | ............ H01B/7/04 |
| WO | 98/08027 | 10/1998 | |

* cited by examiner

Primary Examiner—William H. Mayo, III
(74) Attorney, Agent, or Firm—Guerry L. Grune

(57) ABSTRACT

The present invention includes a high performance communications cable that includes core support-separators which define clearance channels to maintain spacing between transmission media or transmission media pairs. The core support-separator can be either interior to a cable jacket or be employed singularly without the benefit of a jacket and extends along the longitudinal length of the communications cable. Alternatively, with no jacket for cable completion, a thin layer of material along the exterior of the support-separator acts as a type of skin for mechanical protection. The core support-separator has a central region that includes flap-tops along the radial edge that are available for partial or complete sealing of the clearance channels during manufacturing operations. The central region may also include a hollow center portion. Each of the defined clearance channels allow for disposal therein of metal conductors and/or optical fibers.

46 Claims, 20 Drawing Sheets

HIGH PERFORMANCE SUPPORT-SEPARATOR FOR COMMUNICATIONS CABLE

FIELD OF INVENTION

This invention relates to a high performance multi-media communications cable utilizing paired or unpaired electrical conductors or optical fibers. More particularly, it relates to cables having a central core defining singular or plural individual pair channels. The communications cable has an interior core support-separator that defines a clearance through which conductors or optical fibers may be disposed.

BACKGROUND OF THE INVENTION

Many communication systems utilize high performance cables normally having four pairs or more that typically consist of two twisted pairs transmitting data and two receiving data as well as the possibility of four or more pairs multiplexing in both directions. A twisted pair is a pair of conductors twisted about each other. A transmitting twisted pair and a receiving twisted pair often form a subgroup in a cable having four twisted pairs. High-speed data communications media in current usage includes pairs of wire twisted together to form a balanced transmission line. Optical fiber cables may include such twisted pairs or replace them altogether with optical transmission media (fiber optics).

When twisted pairs are closely placed, such as in a communications cable, electrical energy may be transferred from one pair of a cable to another. Energy transferred between conductor pairs is undesirable and referred to as crosstalk. The Telecommunications Industry Association and Electronics Industry Association have defined standards for crosstalk, including TIA/EIA-568A. The International Electrotechnical Commission has also defined standards for data communication cable crosstalk, including ISO/IEC 11801. One high-performance standard for 100 MHz cable is ISO/IEC 11801, Category 5. Additionally, more stringent standards are being implemented for higher frequency cables including Category 6 and Category 7, which includes frequencies of 200 and 600 MHz, respectively.

In conventional cable, each twisted pair of conductors for a cable has a specified distance between twists along the longitudinal direction. That distance is referred to as the pair lay. When adjacent twisted pairs have the same pair lay and/or twist direction, they tend to lie within a cable more closely spaced than when they have different pair lays and/or twist direction. Such close spacing increases the amount of undesirable crosstalk that occurs. Therefore, in many conventional cables, each twisted pair within the cable has a unique pair lay in order to increase the spacing between pairs and thereby to reduce the crosstalk between twisted pairs of a cable. Twist direction may also be varied. Along with varying pair lays and twist directions, individual solid metal or woven-metal air shields can be used to electromagnetically isolate pairs from each other or isolate the pairs from the cable jacket.

Shielded cable, although exhibiting better crosstalk isolation, is more difficult, time consuming and costly to manufacture, install, and terminate. Individually shielded pairs must generally be terminated using special tools, devices and techniques adapted for the job, also increasing cost and difficulty.

One popular cable type meeting the above specifications is Unshielded Twisted Pair (UTP) cable. Because it does not include shielded pairs, UTP is preferred by installers and others associated with wiring building premises, as it is easily installed and terminated. However, UTP fails to achieve superior crosstalk isolation such as required by the evolving higher frequency standards for, data and other state of the art transmission cable systems, even when varying pair lays are used.

Some cables have used supports in connection with twisted pairs. These cables, however, suggest using a standard "X", or "+" shaped support, hereinafter both referred to as the "X" support. Protrusions may extend from the standard "X" support. The protrusions of these prior inventions have exhibited substantially parallel sides.

The document, U.S. Pat. No. 3,819,443, hereby incorporated by reference, describes a shielding member comprising laminated strips of metal and plastics material that are cut, bent, and assembled together to define radial branches on said member. It also describes a cable including a set of conductors arranged in pairs, said shielding member and an insulative outer sheath around the set of conductors. In this cable the shielding member with the radial branches compartmentalizes the interior of the cable. The various pairs of the cable are therefore separated from each other, but each is only partially shielded, which is not so effective as shielding around each pair and is not always satisfactory.

The solution to the problem of twisted pairs lying too closely together within a cable is embodied in three U.S. Pat. Nos. 6,150,612 to Prestolite, 5,952,615 to Filotex, and 5,969,295 to CommScope incorporated by reference herein, as well as an earlier similar design of a cable manufactured by Belden Wire & Cable Company as product number 1711A. The prongs or splines in the Belden cable provide superior crush resistance to the protrusions of the standard "X" support. The superior crush resistance better preserves the geometry of the pairs relatives to each other and of the pairs relative to the other parts of the cables such as the shield. In addition, the prongs or splines in this invention preferably have a pointed or slightly rounded apex top which easily accommodates an overall shield. These cables include four or more twisted pair media radially disposed about a "+"-shaped core. Each twisted pair nests between two fins of the "+"-shaped core, being separated from adjacent twisted pairs by the core. This helps reduce and stabilize crosstalk between the twisted pair media. U.S. Pat. No. 5,789,711 to Belden describes a "star" separator that accomplishes much of what has been described above and is also herein incorporated by reference.

However, these core types can add substantial cost to the cable, as well as material which forms a potential fire hazard, as explained below, while achieving a crosstalk reduction of typically 3 dB or more. This crosstalk value is based on a cable comprised of a fluorinated ethylene-propylene (FEP) conductors with PVC jackets as well as cables constructed of FEP jackets with FEP insulated conductors. Cables where no separation between pairs exist will exhibit smaller crosstalk values. When pairs are allowed to shift based on "free space" within the confines of the cable jacket, the fact that the pairs may "float" within a free space can reduce overall attenuation values due to the ability to use a larger conductor to maintain 100 ohm impedance. The trade-off with allowing the pairs to float is that the pair of conductors tend to separate slightly and randomly. This undesirable separation contributes to increased structural return loss (SRL) and more variation in impedance. One method to overcome this undesirable trait is to twist the conductor pairs with a very tight lay. This method has been proven impractical because such tight lays are expensive and greatly limits the cable manufacturer's throughput (yield). An improvement included by the present invention to structural return loss and improved attenuation is to provide grooves within channels for conductor pairs such that the pairs are fixedly adhered to the walls of these grooves or at least forced within a confined space to prevent floating simply by geometric configuration.

In building designs, many precautions are taken to resist the spread of flame and the generation of and spread of smoke throughout a building in case of an outbreak of fire. Clearly, the cable is designed to protect against loss of life and also minimize the costs of a fire due to the destruction of electrical and other equipment. Therefore, wires and cables for building installations are required to comply with the various flammability requirements of the National Electrical Code (NEC) in the U.S. as well as International Electrotechnical Commission (EIC) and/or the Canadian Electrical Code (CEC).

Cables intended for installation in the air handling spaces (i.e. plenums, ducts, etc.) of buildings are specifically required by NEC/CEC/IEC to pass the flame test specified by Underwriters Laboratories Inc. (UL), UL-910, or its Canadian Standards Association (CSA) equivalent, the FT6. The UL-910 and the FT6 represent the top of the fire rating hierarchy established by the NEC and CEC respectively. Also important are the UL 1666 Riser test and the IEC 60332-3C and D flammability criteria. Cables possessing these ratings, generically known as "plenum" or "plenum rated" or "riser" or "riser rated", may be substituted for cables having a lower rating (i.e. CMR, CM, CMX, FT4, FTI or their equivalents), while lower rated cables may not be used where plenum or riser rated cables are required.

Cables conforming to NEC/CEC/IEC requirements are characterized as possessing superior resistance to ignitability, greater resistant to contribute to flame spread and generate lower levels of smoke during fires than cables having lower fire ratings. Often these properties can be anticipated by the use of measuring a Limiting Oxygen Index (LOI) for specific materials used to construct the cable. Conventional designs of data grade telecommunication cable for installations in plenum chambers have a low smoke generating jacket material, e.g. of a specially filled PVC formulation or a fluoropolymer material, surrounding a core of twisted conductor pairs, each conductor individually insulated with a fluorinated insulation layer. Cable produced as described above satisfies recognized plenum test requirements such as the "peak smoke" and "average smoke" requirements of the Underwriters Laboratories, Inc., UL910 Steiner tunnel test and/or Canadian Standards Association CSA-FT6 (Plenum Flame Test) while also achieving desired electrical performance in accordance with EIA/TIA-568A for high frequency signal transmission.

While the above described conventional cable, including the Belden 1711A cable design, due in part to their use of fluorinated polymers, meets all of the above design criteria, the use of fluorinated polymers is extremely expensive and may account for up to 60% of the cost of a cable designed for plenum usage. The solid core of these communications cables contribute a large volume of fuel to a potential cable fire. Forming the core of a fire resistant material, such as with FEP, is very costly due to the volume of material used in the core, but it should help reduce flame spread over the 20 minute test period.

Solid flame retardant/smoke suppressed polyolefins may also be used in connection with fluorinated polymers. Commercially available solid flame retardant/smoke suppressed polyolefin compounds all possess dielectric properties inferior to that of FEP and similar fluorinated polymers. In addition, they also exhibit inferior resistance to burning and generally produce more smoke than FEP under burning conditions.

A high performance communications data cable utilizing twisted pair technology must meet exacting specification with regard to data speed, electrical,as well as flammability and smoke characteristics. The electrical characteristics include specifically the ability to control impedance, near-end cross-talk (NEXT), ACR (attenuation cross-talk ratio) and shield transfer impedance. A method used for twisted pair data cables that has been tried to meet the electrical characteristics, such as controlled NEXT, is by utilizing individually shielded twisted pairs (ISTP). These shields insulate each pair from NEXT. Data cables have also used very complex lay techniques to cancel E and B (electric and magnetic fields ) to control NEXT. In addition, previously manufactured data cables have been designed to meet ACR requirements by utilizing very low dielectric constant insulation materials. Use of the above techniques to control electrical characteristics have inherent problems that have lead to various cable methods and designs to overcome these problems. Current designs must also meet the UL 910 flame and smoke criteria using both fluorinated and non-fluorinated jackets as well as fluorinated and non-fluorinated insulation materials for the conductors of these cable constructions. In Europe, the trend continues to be use of halogen free insulation for all components, which also must meet stringent flammability regulations.

Individual shielding is costly and complex to process. Individual shielding is highly susceptible to geometric instability during processing and use. In addition, the ground plane of individual shields, 360° in ISTP's—individually shielded twisted pairs is also an expensive process. Lay techniques and the associated multi-shaped anvils of the present invention to achieve such lay geometries are also complex, costly and susceptible to instability during processing and use. Another problem with many data cables is their susceptibility to deformation during manufacture and use. Deformation of the cable geometry, such as the shield, also potentially severely reduces the electrical and optical consistency.

Optical fiber cables exhibits a separate set of needs that include weight reduction (of the overall cable), optical functionality without change in optical properties and mechanical integrity to prevent damage to glass fibers. For multi-media cable, i.e. cable that contains both metal conductors and optical fibers, the set of criteria is often incompatible. The use of the present invention, however, renders these often divergent set of criteria compatible. Specifically, optical fibers must have sufficient volume in which the buffering and jacketing plenum materials (FEP and the like) covering the inner glass fibers can expand and contract over a broad temperature range without restriction, for example −40 C to 80 C experienced during shipping. It has been shown by Grune, et. al., among others, that cyclical compression and expansion directly contacting the buffered glass fiber causes excess attenuation light loss (as measured in dB) in the glass fiber. The design of the present invention allows for designation and placement of optical fibers in clearance channels provided by the support-separator, having multi-anvil shaped profiles. It would also be possible to place both glass fiber and metal conductors in the same designated clearance channel if such a design is required. In either case the forced spacing and separation from the cable jacket (or absence of a cable jacket) would eliminate the undesirable set of cyclical forces that cause excess attenuation light loss.

In addition, fragile optical fibers are susceptible to mechanical damage without crush resistant members (in addition to conventional jacketing). The present invention also addresses this problem.

The need to improve the cable design, reduce costs, and improve both flammability and electrical properties continues to exist.

SUMMARY OF THE INVENTION

This invention provides a lower cost communications cable exhibiting improved electrical, flammability, and optionally, optical properties. The cable has an interior support extending along the longitudinal length of the communications cable. The interior support has a central region extending along the longitudinal length of the interior support. In the preferred configuration, the cable includes a geometrically symmetrical core support-separator with a plurality of either solid or foamed anvil-shaped sections that extend radially outward from the central region along the longitudinal or axial length of the cable's central region. The core support-separator is optionally foamed and has an optional hollow center. Each section is adjacent to each other with a minimum of two adjacent anvil-shaped sections. The anvil-shaped sections of the core support-separator may be helixed as the core extends along the length of the communications cable. Each of the adjacent anvil-shaped sections defines a clearance which extends along the longitudinal length of the multi-anvil shaped core support-separator. The clearance provides a channel for each of the conductors/optical fibers or conductor pairs used within the cable. The clearance channels formed by the multi-anvil shaped core support-separator extend along the same length of the central portion. The channels are either semi-circular or fully circular shaped cross-sections with completely closed surfaces in the radial direction toward the center portion of the core and optionally opened or closed surfaces at the outer radial portion of the same core. Adjacent channels are separated from each other to provide a chamber for at least a pair of conductors or an optical fiber or optical fibers.

The anvil-shaped core support-separator of this invention provides a superior crush resistance to the protrusions of the standard "X" or other similar supports. The superior crush resistance is obtained by the arch-like design of each clearance channel providing additional support to the outer section of the cable. The anvil-shaped core better preserves the geometry of the pairs relative to each other and of the pairs relative to the other parts of the cables, such as the possible use of a shield or optical fibers. In addition, the anvil-shape provides an exterior surface that essentially establishes the desired roundness for cable manufacturers. The exterior roundness ensures ease of die development and eventual extrusion. The rounded surface of the core also allows for easy accommodation of an overall external shield.

According to one embodiment, the cable includes a plurality of transmission media with metal and/or optical conductors that are individually disposed; and an optional outer jacket maintaining the plurality of data transmission media in proper position with respect to the core. The core is comprised of a support-separator having a multi-anvil shaped profile that defines a clearance to maintain a spacing between transmission media or transmission media pairs in the finished cable. The core may be formed of a conductive or insulative material to further reduce crosstalk, impedance and attenuation.

Accordingly, the present invention provides for a communications cable, with a multi-anvil shaped support-separator, that meets the exacting specifications of high performance data cables and/or fiber optics or the possibility of including both transmission media in one cable, has a superior resistance to deformation during manufacturing and use, allows for control of near-end cross-talk, controls electrical instability due to shielding, is capable of 200 and 600 MHz (Categories 6 and 7) transmission with a positive attenuation to cross-talk ratio (ACR ratio) of typically 3 to 10 dB.

Moreover, the present invention provides a separator so that the jacket material (which normally has inferior electrical properties as compared with the conductor material) is actually pushed away from the electrical conductor, thus acting to again improve electrical performance (ACR, etc.) over the life of the use of the cable. The anvil-shaped separator, by simple geometric considerations is also superior to the "X" type separator in that it increases the physical distance between the conductor pairs within the same cable configuration, as shown in FIGS. 2 and 3.

Additionally, it has been known that the conductor pair may actually have physical or chemical bonds that allow for the pair to remain intimately bound along the length of the cavity in which they lie. The present invention describes a means by which the conductor pairs are adhered to or forced along the cavity walls by the use of grooves. This again increases the distance, thereby increasing the volume of air or other dielectrically superior medium between conductors in separate cavities. As discussed above, spacing between pairs, spacing away from jackets, and balanced spacing all have an effect on final electrical cable performance.

It is an object of the invention to provide a data/multimedia cable that has a specially designed interior support that accommodates conductors with a variety of AWG's, impedances, improved crush resistance, controlled NEXT, controlled electrical instability due to shielding, increased breaking strength, and allows the conductors, such as twisted pairs, to be spaced in a manner to achieve positive ACR ratios.

It is still another object of the invention to provide a cable that does not require individual shielding and that allows for the precise spacing of conductors such as twisted pairs and/or fiber optics with relative ease. In the present invention, the cable would include individual glass fibers as well as conventional metal conductors as the transmission medium that would be either together or separated in clearance channel chambers provided by the anvil-shaped sections of the core support-separator.

Another embodiment of the invention includes having a multi-anvil shaped core support-separator with a central region that is either solid or partially solid. This includes the use of a foamed core and/or the use of a hollow center of the core, which in both cases significantly reduces the material required along the length of the finished cable. The effect of foaming and/or producing a support-separator with a hollow center portion should result in improved flammability of the overall cable by reducing the amount of material available as fuel for the UL 910 test, improved electrical properties for the individual non-optical conductors, and reduction of weight of the overall cable.

Another embodiment includes fully opened surface sections defining the core clearance channels which extend along the longitudinal length of the multi-anvil shaped core support-separator. This clearance provides half-circular channel walls for each of the conductors/optical fibers or conductor pairs used within the cable. A second version of this embodiment includes a semi-closed or semi-opened surface section defining the same core clearance channel walls. These channel walls would be semi-circular to the point that at least 200 degrees of the potential 360 degree wall enclosure exists. Typically, these channels walls would include and opening of 0.005 inches to 0.011 inches wide. A third version of this embodiment includes either a fully closed channel or an almost fully closed channel of the anvil-shaped core support-separator such that this version could include the use of a "flap-top" initially providing an opening for insertion of conductors or fibers and thereafter providing a covering for these same conductors or fibers in the same channel. The flap-top closure can be accomplished by a number of manufacturing methods including heat sealing during extrusion of the finished cable product. Other methods include a press-fit design, taping of the full assembly, or even a thin skin extrusion that would cover a portion of the multi-anvil shaped separator. All such designs could be substituted either in-lieu of a separate cable jacket or with a cable jacket, depending on the final property requirements.

Yet another embodiment of the invention allows for interior corrugated clearance channels provided by the anvil-shaped sections of the core support-separator. This corrugated internal section has internal axial grooves that allow for separation of conductor pairs from each other or even separation of single conductors from each other as well as separation of optical conductors from conventional metal conductors.

Alternatively, the edges of said grooves may allow for separation thus providing a method for uniformly locating or spacing the conductor pairs with respect to the channel walls instead of allowing for random floating of the conductor pairs.

Each groove can accommodate at least one twisted pair. In some instances, it may be beneficial to keep the two conductors in intimate contact with each other by providing grooves that ensure that the pairs are forced to contact a portion of the wall of the clearance channels. The interior support provides needed structural stability during manufacture and use. The grooves also improve NEXT control by allowing for the easy spacing of the twisted pairs. The easy spacing lessens the need for complex and hard to control lay procedures and individual shielding. Other significant advantageous results such as: improved impedance determination because of the ability to precisely place twisted pairs: the ability to meet a positive ACR value from twisted pair to twisted pair with a cable that is no larger than an ISTP cable; and an interior support which allows for a variety of twisted pair and optical fiber dimensions.

Yet another related embodiment includes the use of an exterior corrugated or convoluted design such that the outer surface of the support-separator has external radial grooves along the longitudinal length of the cable. This exterior surface can itself function as a jacket if the fully closed anvil-shaped version of the invention as described above is utilized. Additionally, the jacket may have a corrugated, smooth or ribbed surface depending on the nature of the installation requirements. In raceways or plenum areas that are new and no previous wire or cable has been installed, the use of corrugated surfaces can enhance flex and bending mechanical strength. For other installations, a smooth surface reduces the possibility of high friction when pulling cable into areas where it may contact surfaces other than the raceway or plenum. Mechanical integrity using an outer jacket such as depicted in FIGS. 2A, 2B, or 2C may be essential for installation purposes.

Alternatively, depending on manufacturing capabilities, the use of a tape or polymeric binding sheet may be necessary in lieu of extruded thermoplastic jacketing. Taping or other means may provide special properties of the cable construction such as reduced halogen content or cost and such a construction is found in FIG. 2C.

Yet another related embodiment includes the use of a strength member together with, but outside of the multi-anvil shaped core support-separator running parallel in the longitudinal direction along the length of the communications cable. In a related embodiment, the strength member could be the core support-separator itself, or in an additional related embodiment, the strength member could be inserted in the hollow center-portion of the core.

According to another embodiment of the invention, the multi-anvil shaped core support-separator optionally includes a slotted section allowing for insertion of an earthing wire to ensure proper and sufficient electrical grounding preventing electrical drift.

Finally, it is possible to leave the multi-anvil shaped separator cavities empty in that the separator itself or within a jacket would be pulled into place and left for future "blown fiber" or other conductors along the length using compressed air or similar techniques such as use of a pulling tape or the like It is understood that each of the embodiments above could include a flame-retarded, smoke suppressant version and that each could include the use of recycled or reground thermoplastics in an amount up to 100%.

A method of producing the communications cable, introducing an anvil-shaped core as described above, into the cable assembly, is described as first passing a plurality of transmission media and a core through a first die which aligns the plurality of transmission media with surface features of the core and prevents or intentionally allows twisting motion of the core. Next, the method bunches the aligned plurality of transmission media and core using a second die which forces each of the plurality of the transmission media into contact with the surface features of the core which maintain a spatial relationship between each of plurality of transmission media. Finally, the bunched plurality of transmission media and core are optionally twisted to close the cable, and the closed cable optionally jacketed.

Other desired embodiments, results, and novel features of the present invention will become more apparent from the following drawings and detailed description and the accompanying claims.

DETAILED DESCRIPTION

The following description will further help to explain the inventive features of the cable and the interior support portion of the cable.

Figure 1A:
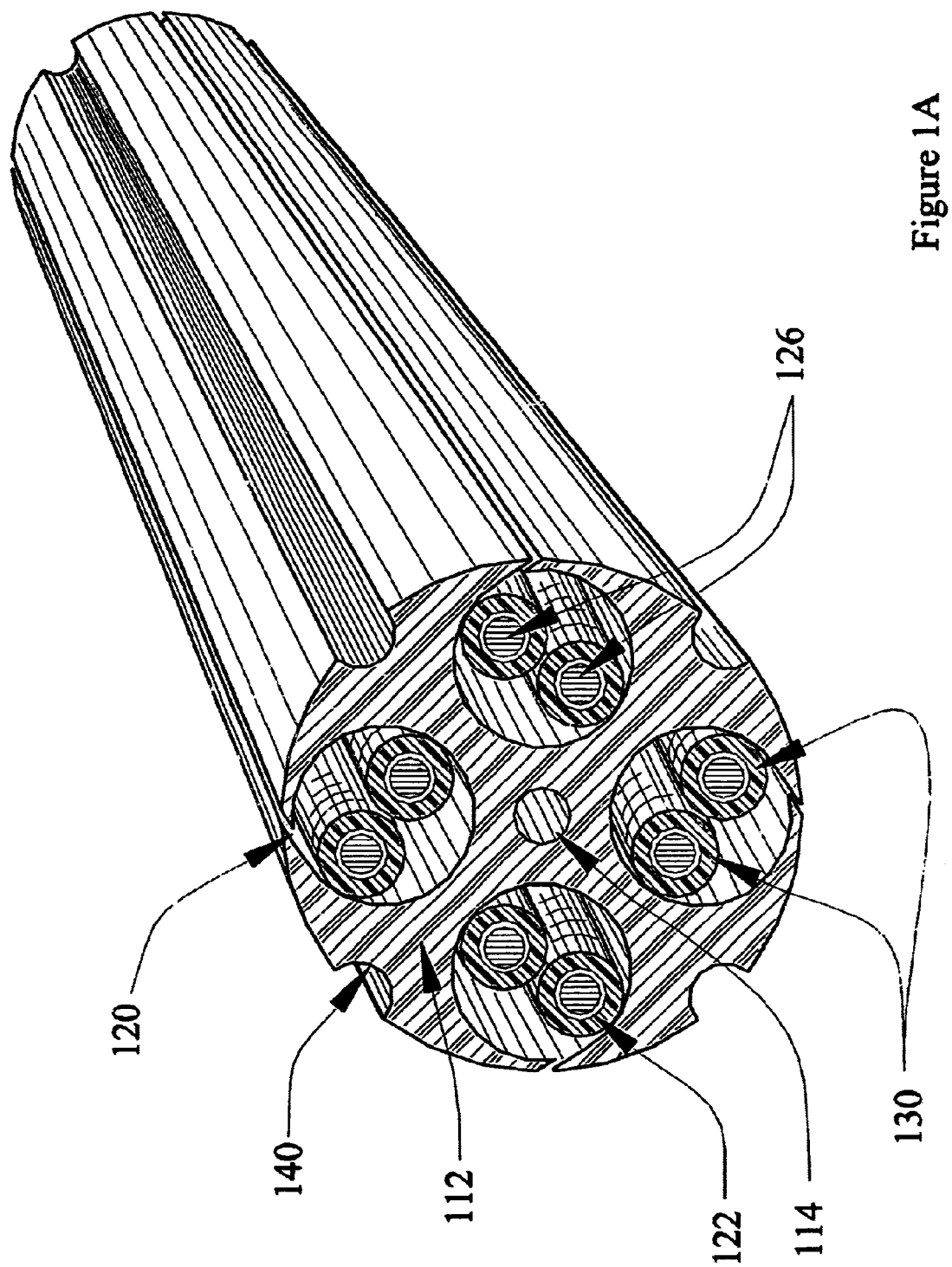
FIG. 1A is a top-right view of one embodiment of the cable and separator that includes solid or foamed polymeric smooth internal and external surfaces.

FIG. 1A is a top-right view of one embodiment of this invention. The shown embodiment has an interior support shown as an anvil-shaped separator with flap-tops (110). The interior support anvil-shaped separator, shown in more detail in FIGS. 3 and 4, runs along the longitudinal length on the cable. The interior support anvil-shaped separator, hereinafter, in the detailed description, referred to as the "anvil-shaped separator", has a central region (112) extending along the longitudinal length of the cable. The center region includes a cavity that runs the length of the separator in which a strength member (114) may be inserted. Channels 120, 122, 124, and 126 extend along the length of the anvil-shaped separator and provide compartments for conductors (130).

A strength member may be added to the cable. The strength member (114) in the shown embodiment is located in the central region of the anvil-shaped separator. The strength member runs the longitudinal length of the anvil-shaped separator. The strength member is a solid polyethylene or other suitable plastic, textile (nylon, aramid, etc.), fiberglass flexible or rigid (FGE rod), or metallic material.

Conductors, such as the shown insulated twisted pairs, (130) are disposed in each channel. The pairs run the longitudinal length of the anvil-shaped separator. While this embodiment depicts one twisted pair per channel, there may be more than one pair per channel. The twisted pairs are insulated with a suitable polymer, copolymer, or dual extruded foamed insulation with solid skin surface. The conductors are those normally used for optical or conventional data transmission. The twisted pairs may be bonded such that the insulation of each conductor is physically or chemically bound in an adhesive fashion, or an external film could be wrapped around each conductor pair to provide the same effect. Although the embodiment utilizes twisted pairs, one could utilize various types of insulated conductors within the anvil-shaped separator channels or cavities.

Figure 1B:
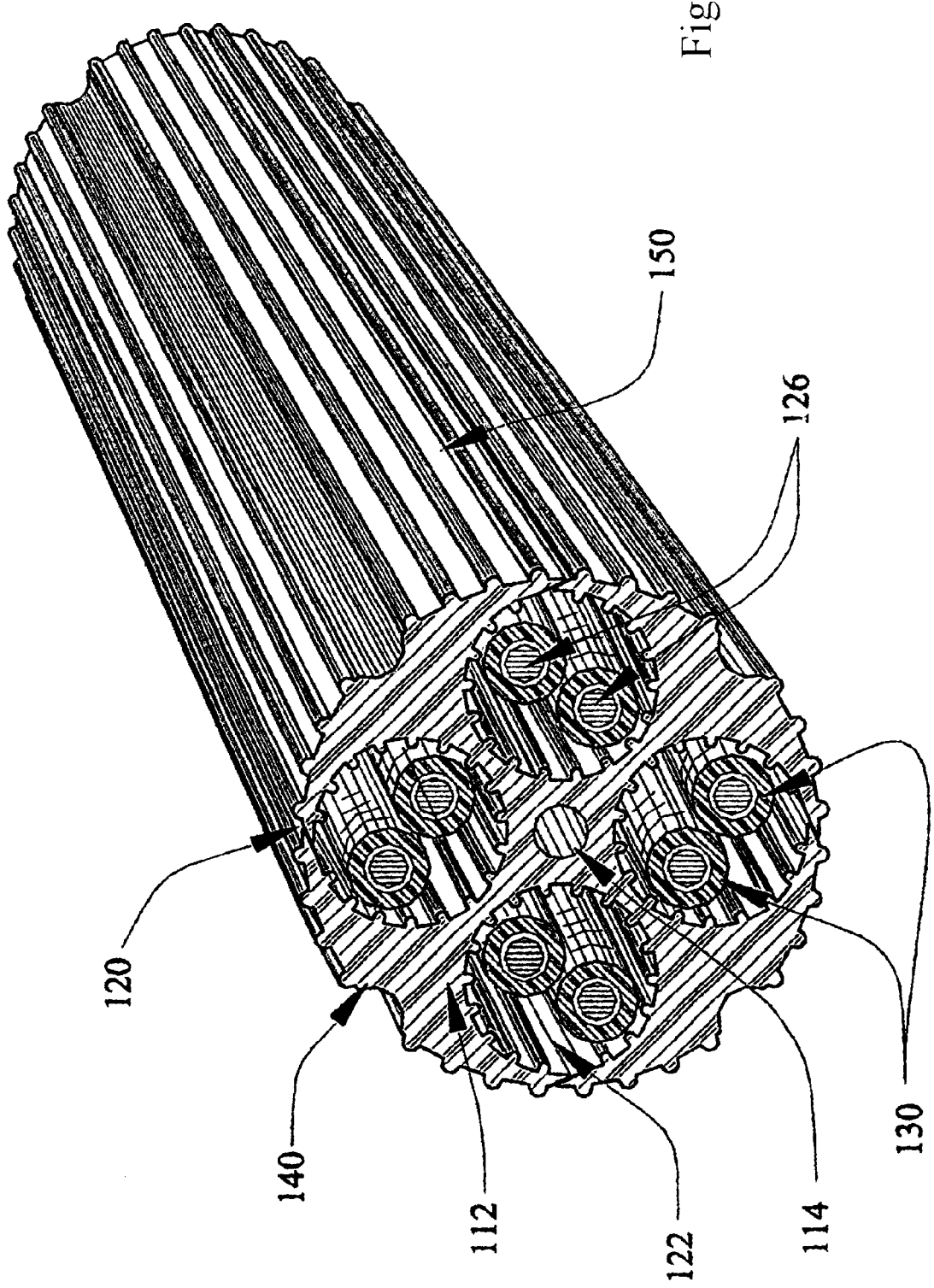
FIG. 1B is a top-right view of one embodiment of the cable and separator that includes solid or foamed polymeric grooved internal and external surfaces.

FIG. 1B is another embodiment that includes grooves both on the exterior surface (150) of the separator and within the channels (152) of the separator. The interior grooves within the channels of this embodiment are specifically designed so that at least a single conductor of a conductor pair can be forced along the inner wall of the groove, thereby allowing for specific spacing that improves electrical properties associated with the conductor or conductor pair.

Figure 1C:
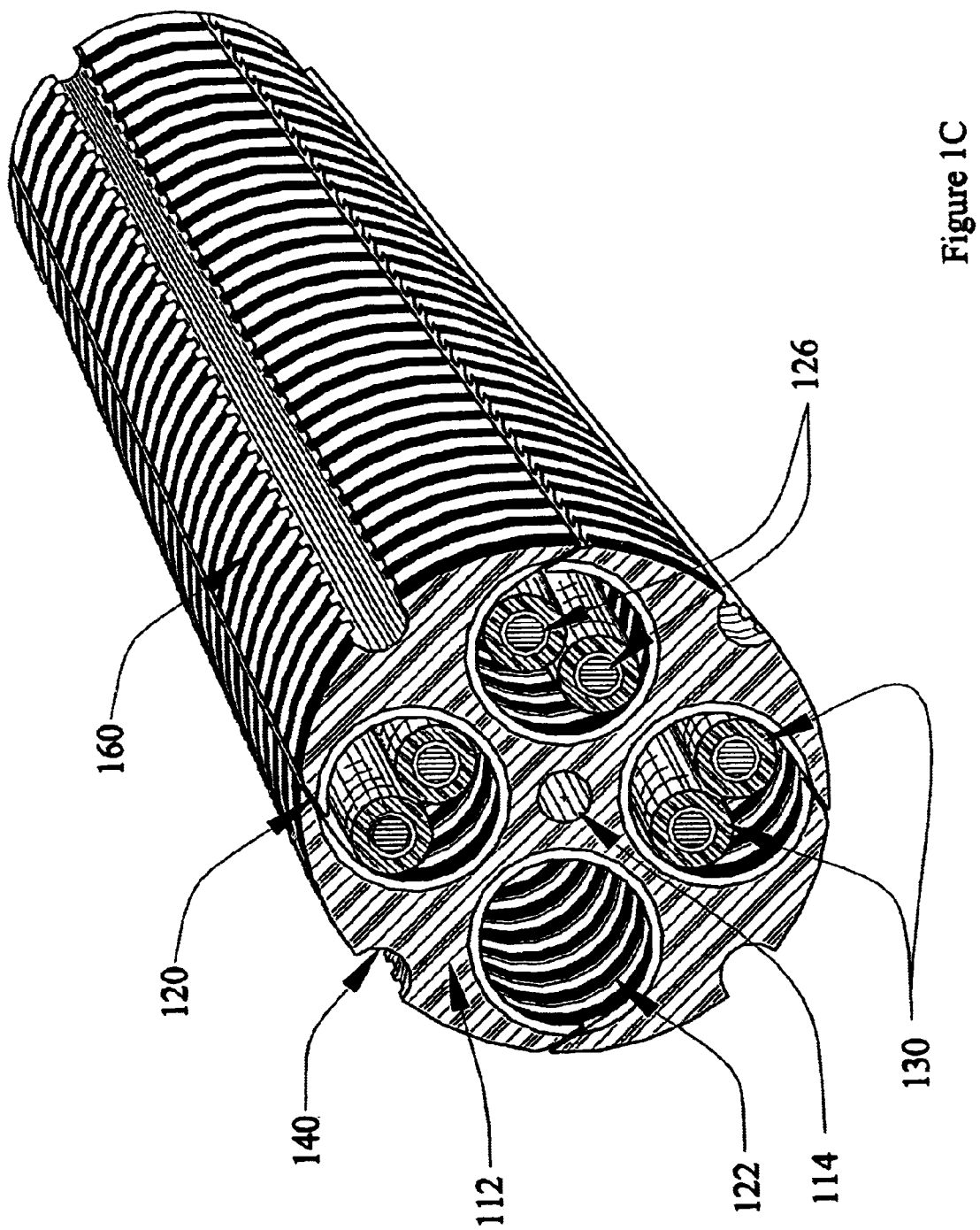
FIG. 1C is a top-right view of one embodiment of the cable and separator that includes solid or foamed polymeric corrugated internal and external surfaces.

FIG. 1C is yet another related embodiment that includes the use of an exterior corrugated design (160) such that the outer surface of the support-separator has external radial grooves along the longitudinal length of the cable. This exterior surface can itself function as a jacket if the fully closed anvil-shaped version of the invention as described above is utilized.

A metal drain wire may be inserted into a specially designated slot (140). The drain wire functions as a ground or earthing wire.

The anvil-shaped separator may be cabled with a helixed configuration. The helically twisted portions in turn define helically twisted conductor receiving grooves within the channels that accommodate the twisted pairs or individual optical fibers.

Figure 2A:
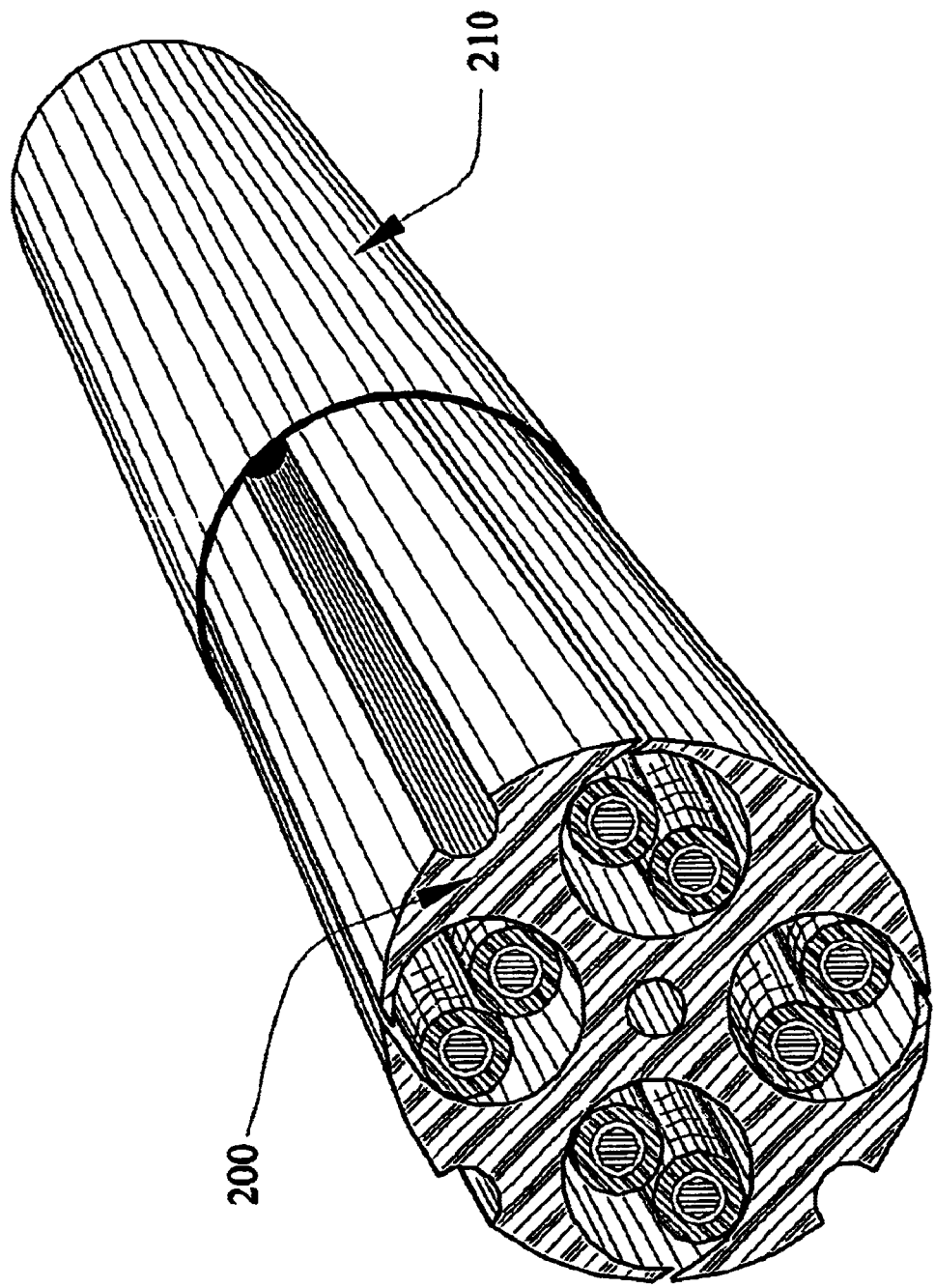
FIG. 2A is a top-right view of one embodiment of the cable and separator that includes an anvil-shaped separator and a smooth/ribbed jacket.

The cable (200), as shown in FIG. 2A is a high performance shielded cable capable of 600 MHz or greater transmission. The cable has an optional outer jacket (210) that can be polyvinyl chloride or neoprene or a fluoropolymer or a polyolefin with or without halogen free material as required by flammability and electrical specifications as detailed above. Additionally, the jacket may be either corrugated (220) or smooth/ribbed (210) depending on the nature of the installation requirements. Mechanical integrity using an outer jacket such as depicted in FIGS. 2A and 2B, may be essential for installation purposes.

Figure 2B:
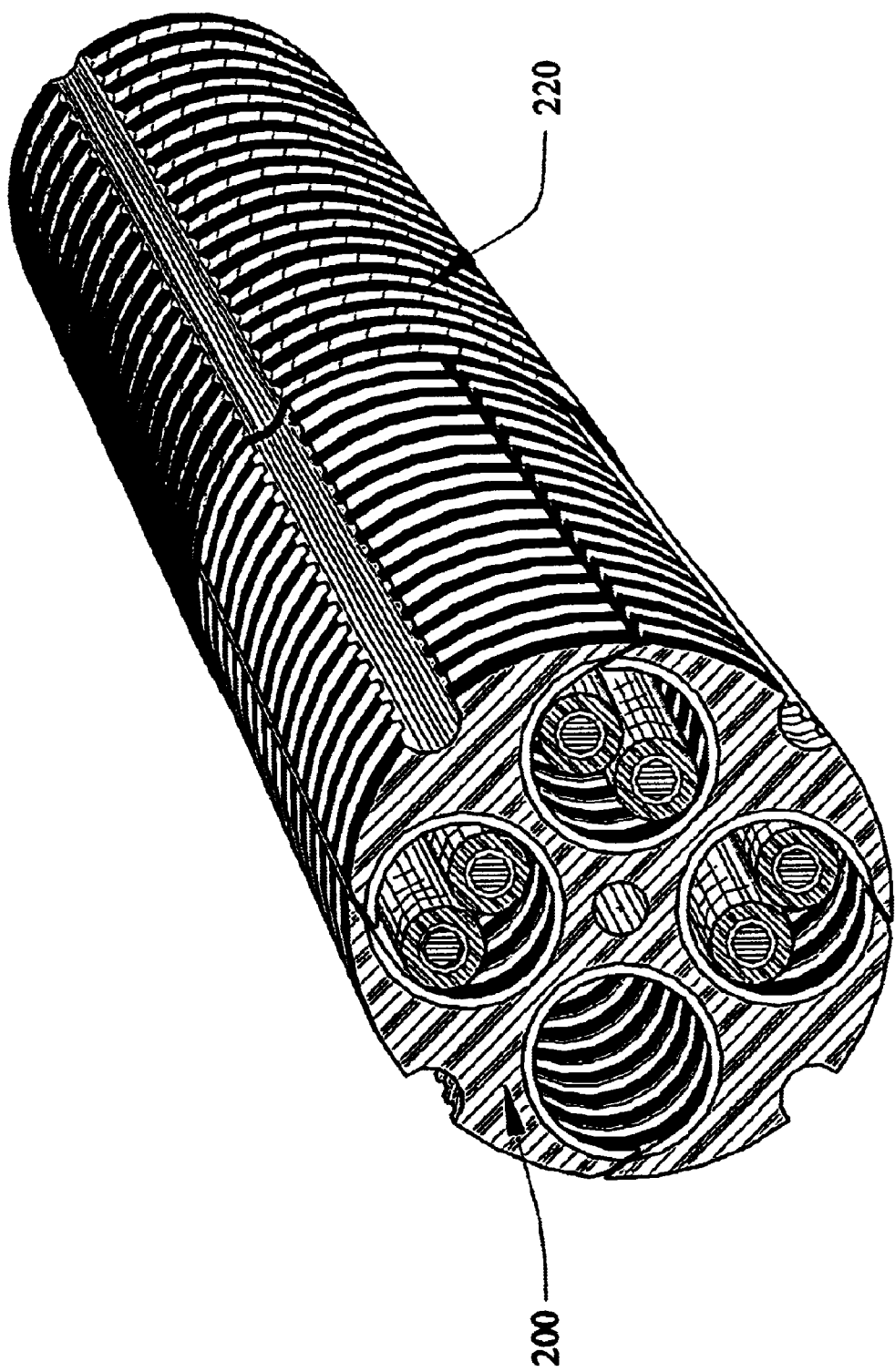
FIG. 2B is a top-right view of another embodiment of the cable and separator that includes a ribbed, corrugated jacket.

FIG. 2B is another embodiment that includes grooves along the interior channels of the separator. The interior grooves within the channels of this embodiment are also specifically designed so that at least a single conductor of a conductor pair can be forced along the inner wall of the groove, thereby allowing for specific spacing that improves electrical properties associated with the conductor or conductor pair.

Figure 2C:
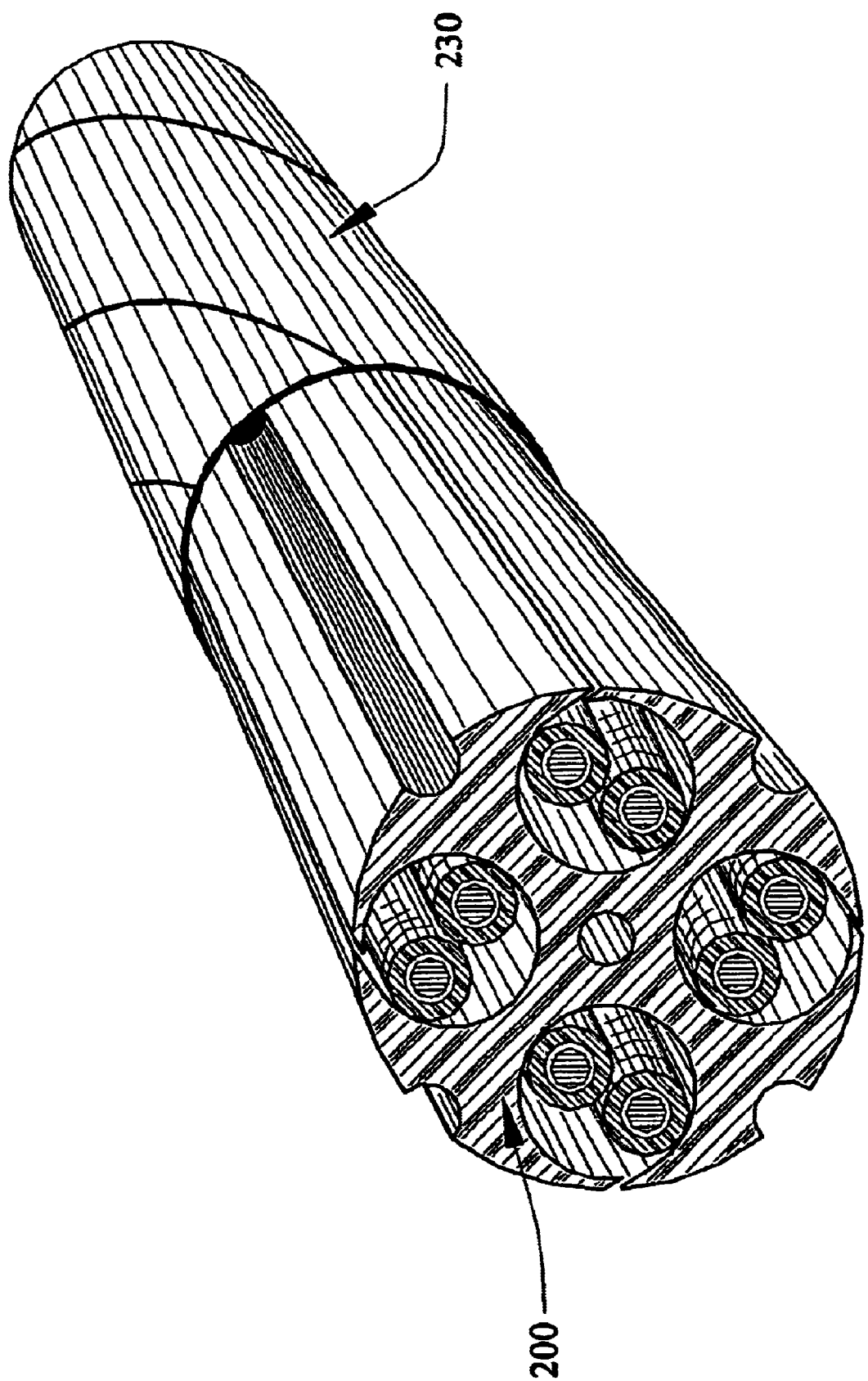
FIG. 2C is a top-right view of another embodiment of the cable and separator that includes a taped or polymer binder sheet jacketing configuration.

Over the anvil shaped separator an optional polymer binder sheet or tape (230) may be used as shown in FIG. 2C. The binder is wrapped around the anvil shaped separator to enclose the twisted pairs or optical fiber bundles. The binder or tape may include an adhesive to hold an optional laterally wrapped shield. The electromagnetic interference and radio frequency (EMI-RFI) shield is a tape with a foil or metal surface facing towards the interior of the jacket that protects the signals carried by the twisted pairs or fiber cables from electromagnetic or radio frequency distortion. The shield may be composed of a foil and has a belt-like shield that can be forced into a round, smooth shape during manufacture. This taped embodiment with shield may be utilized to control electrical properties with extreme precision. A metal drain wire (240) may be inserted into a specially designated slot that then can be subsequently wrapped around the shield. The drain wire within the slot runs the length of the cable. The drain wire functions as a ground or earthing wire.

Use of the term "cable covering" refers to a means to insulate and protect the cable. The cable covering being exterior to said anvil member and insulated conductors disposed in grooves provided within the clearance channels. The outer jacket, shield, drain spiral and binder described in the shown embodiment provide an example of an acceptable cable covering. The cable covering, however, may simply include an outer jacket or may include just the exterior surface (corrugated or convoluted with ribbed or smooth surfaces) of the anvil shaped interior support member.

The cable covering may also include a gel filler to fill the void space (250) between the interior support, twisted pairs and a portion of the cable covering.

The clearance channels formed by the anvil shaped interior support member of the present inventive cable design allows for precise support and placement of the twisted pairs, individual conductors, and optical fibers. The anvil shaped separator will accommodate twisted pairs of varying AWG's and therefore of varying electrical impedance. The unique circular shape of the separator provides a geometry that does not easily crush and allows for maintenance of a cable appearing round in final construction.

The crush resistance of the inventive separator helps preserve the spacing of the twisted pairs, and control twisted pair geometry relative to other cable components. Further, adding a helical twist allows for improving overall electrical performance design capability while preserving the desired geometry.

The optional strength member located in the central region of the anvil shaped separator allows for the displacement of stress loads away from the pairs.

Figure 3A:
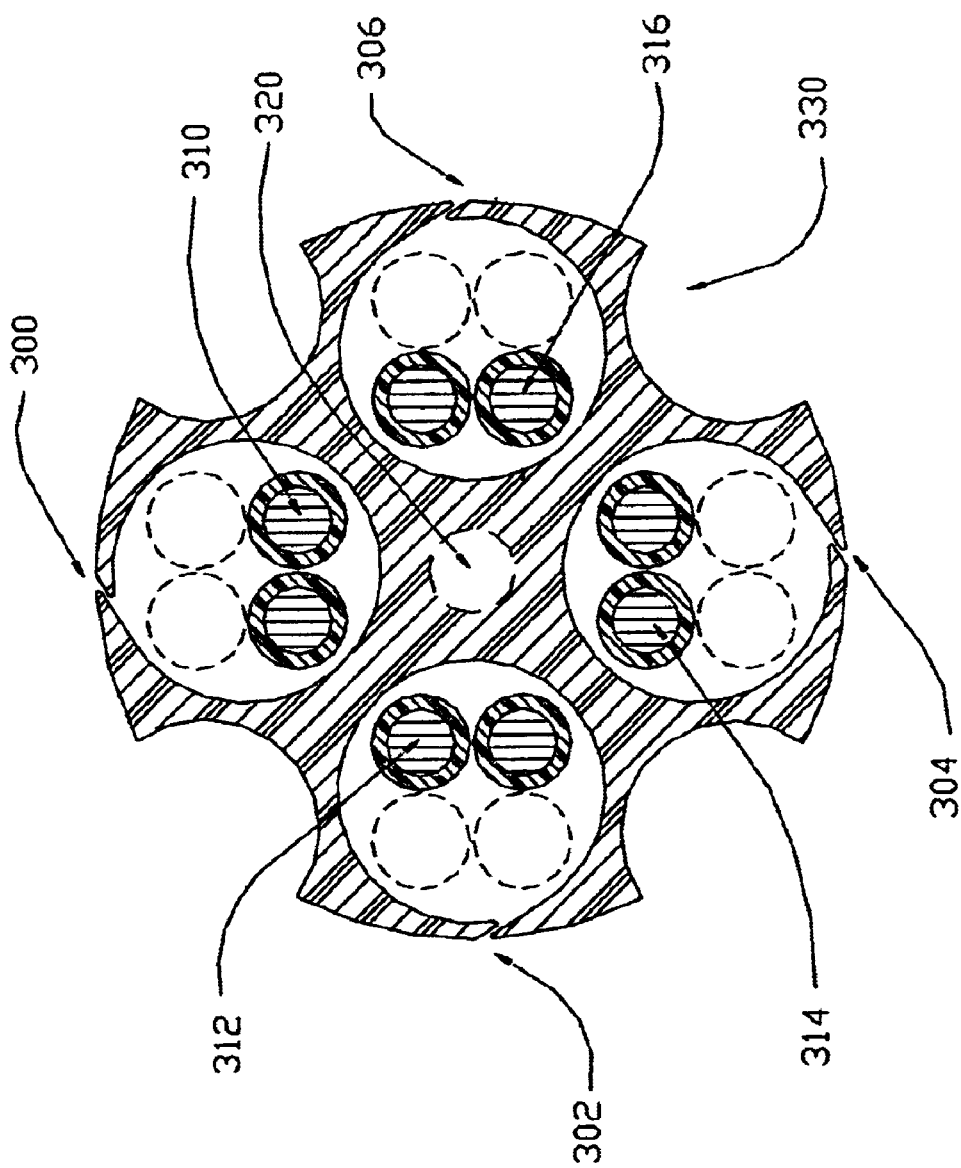
FIG. 3A is a cross-section of the interior support or anvil-shaped separator taken along the horizontal plane of the interior support anvil-shaped separator.

FIG. 3A is a horizontal cross-section of a preferred embodiment of the anvil-shaped separator with dual flap-tops. The anvil-shaped separator can be typically approximately 0.210 inches in diameter. It includes four channels (300, 302, 304, and 306) that are typically approximately 0.0638 to 0.0828 inches in diameter. The channel centers are 90 degrees apart relative to the center of the separator. Each channel is typically approximately 0.005 inches from the channel across from it, and each channel is approximately 0.005–0.011 inches apart from its two nearest-neighboring channels at their closest proximity. Inserted in the channels is one set of twisted pairs (310, 312, 314, and 316) with the option for adding twisted pairs to each channel denoted by dashed circles. In a preferred embodiment, each channel has typically a 0.037-inch opening along its radial edge that allows for the insertion of the twisted pairs. This embodiment also includes a cavity in the center of the anvil-shaped separator for a strength member (320). Additionally, there is a slot for a drain or earthing wire (330).

Figure 3B:
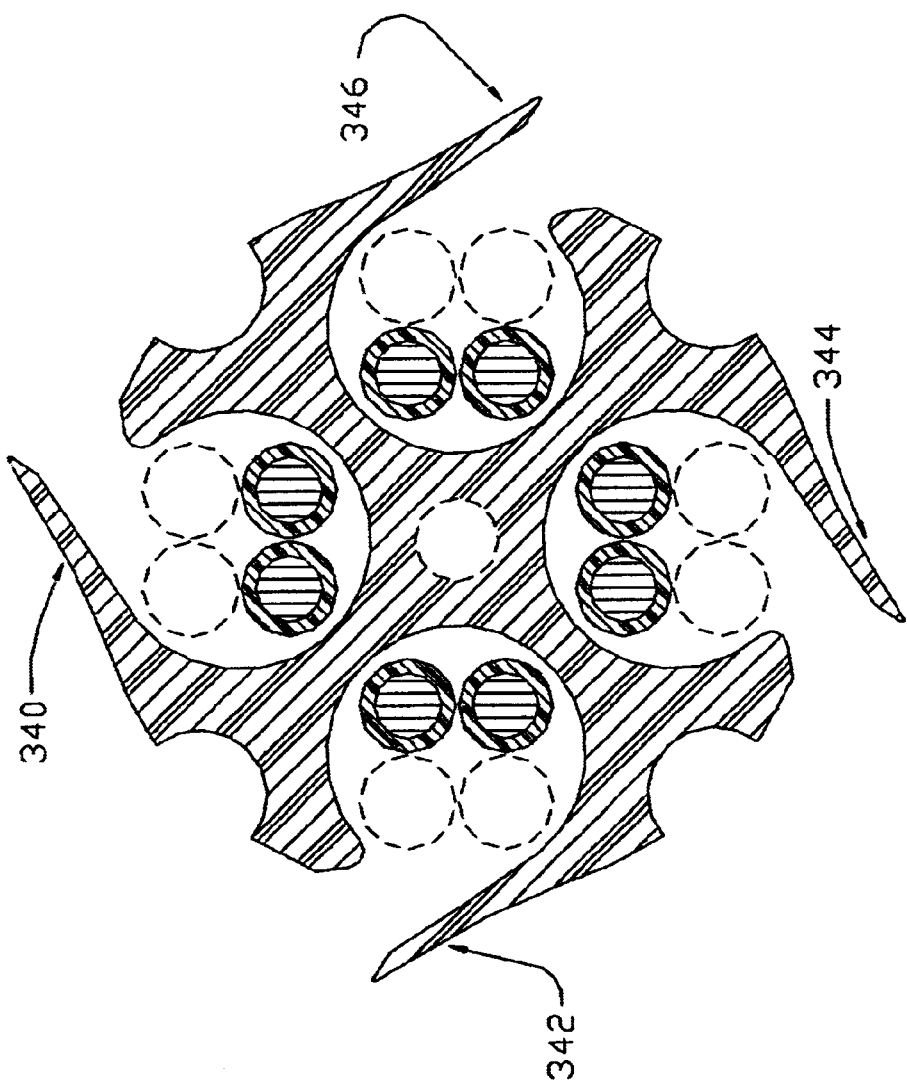
FIG. 3B is a cross-section of the single flap, flap-top embodiment of the interior support or anvil-shaped separator taken along the horizontal plane of the interior support anvil-shaped separator when the flap is open.
Figure 3C:
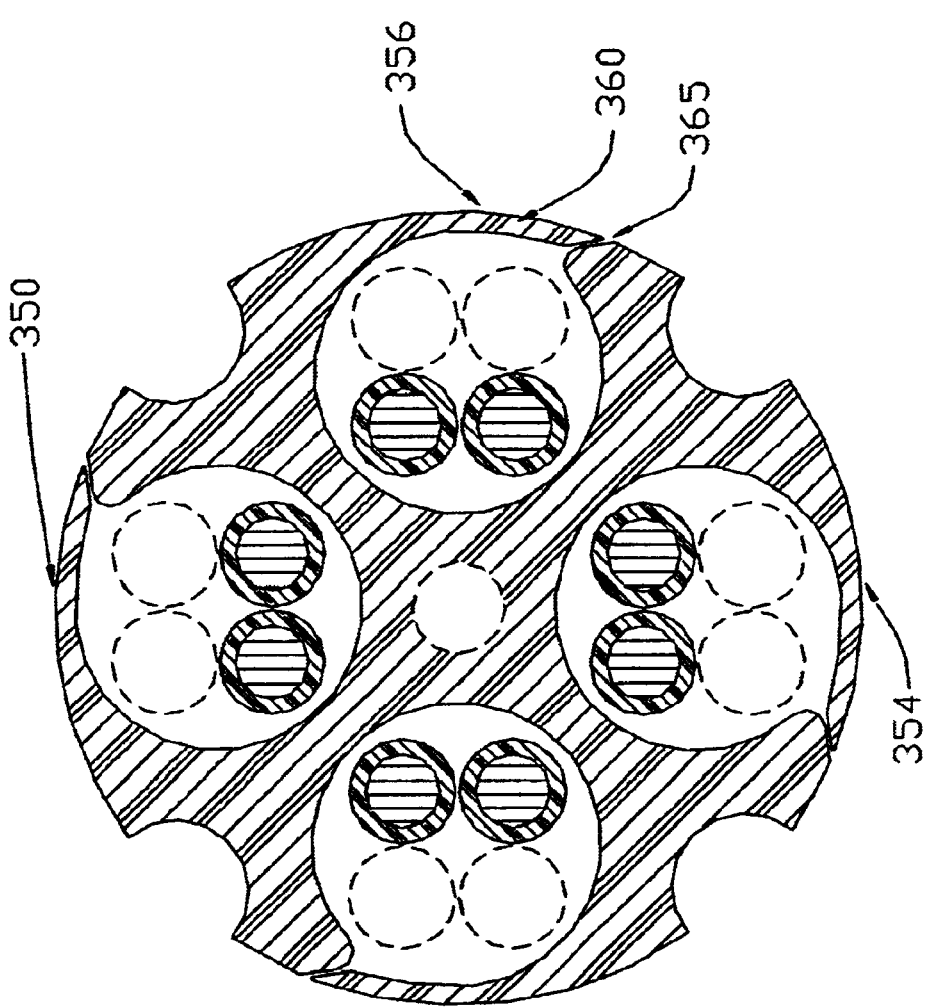
FIG. 3C is a cross-section of the single flap, flap-top embodiment of the interior support or anvil-shaped separator taken along the horizontal plane of the interior support anvil-shaped separator when the flap is closed.

FIG. 3B is another embodiment of the anvil-shaped separator. The anvil-shaped separator includes a single flap-top (340, 342, 344, and 346) that is initially in an open position to allow the twisted pairs to be inserted into the channels. In FIG. 3C the flap-tops are in the closed position (350, 352, 354, and 356) where the flap-top fits into a recessed portion of the separator for closure. The flap-tops are self-sealing when heat and/or pressure is applied, such that elements within the channels can no longer be removed from the separator and such that the channels containing the twisted pairs are enclosed.

Figure 3D:
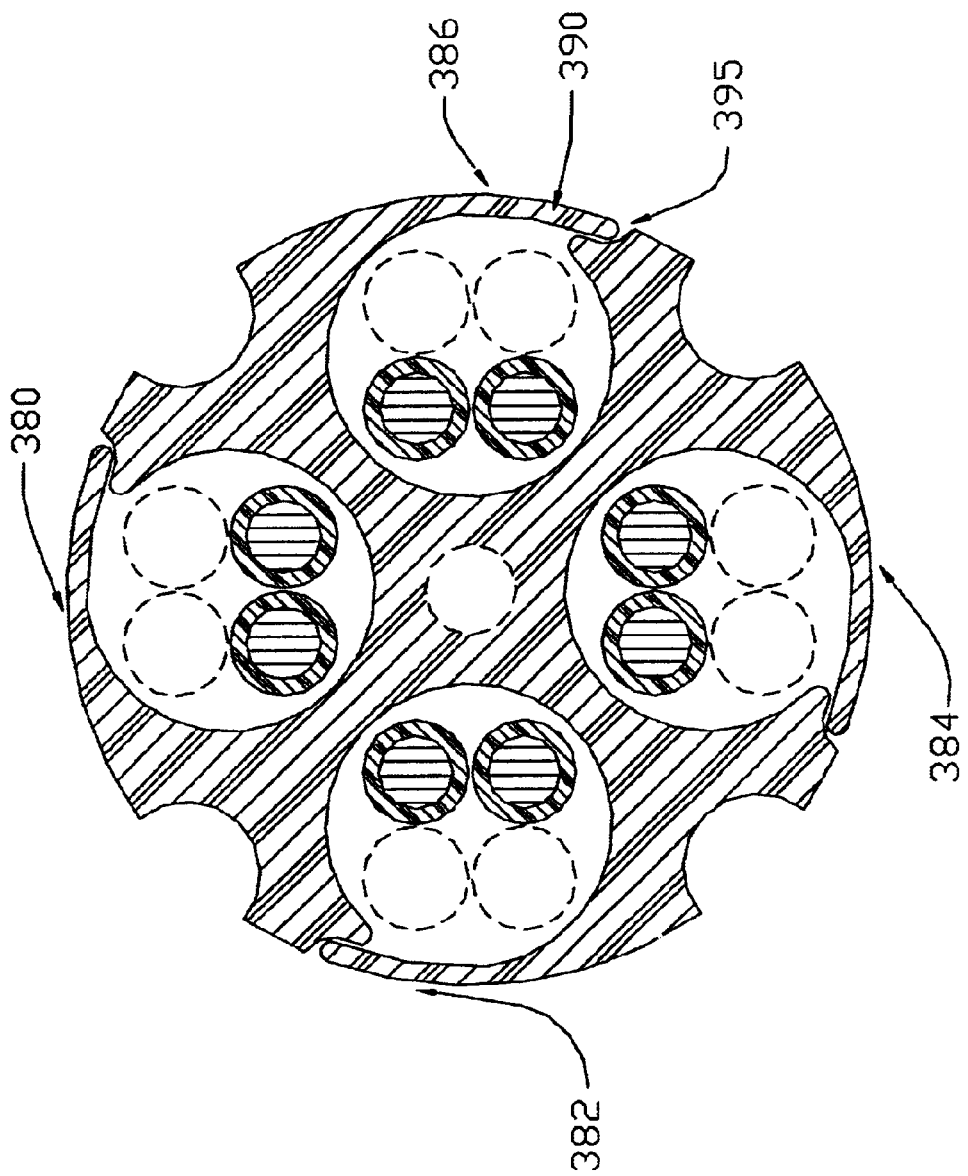
FIG. 3D is a cross-section version of the closed single-flap, flap-top embodiment of the anvil-shaped separator with flap-tops that are rounded at the tapered end.

FIG. 3D is another embodiment of the anvil-shaped separator. This anvil-shaped separator includes a single flap-top (380, 382, 384, and 386) that is depicted in the closed position. When in the closed-position, the flap-top overlaps (390) the outer portion of the separator and has a rounded ending (395). The amount of overlap required will depend on several design and manufacturing factors and the shown embodiment is only intended as one example of the overlap required. The flap-tops are self-sealing when heat and/or pressure is applied, such that the elements within the channels can no longer be removed or displaced from the separator and such that the channels containing twisted pairs are enclosed.

Another embodiment of FIG. 3 includes all of the aforementioned features of FIG. 3 without the drain wire or drain wire slot, but includes the center hole for strength members. A further embodiment of FIG. 3 includes all the aforementioned features of FIG. 3 without the center hole for strength members and without the drain wire or drain wire slots.

Figure 4A:
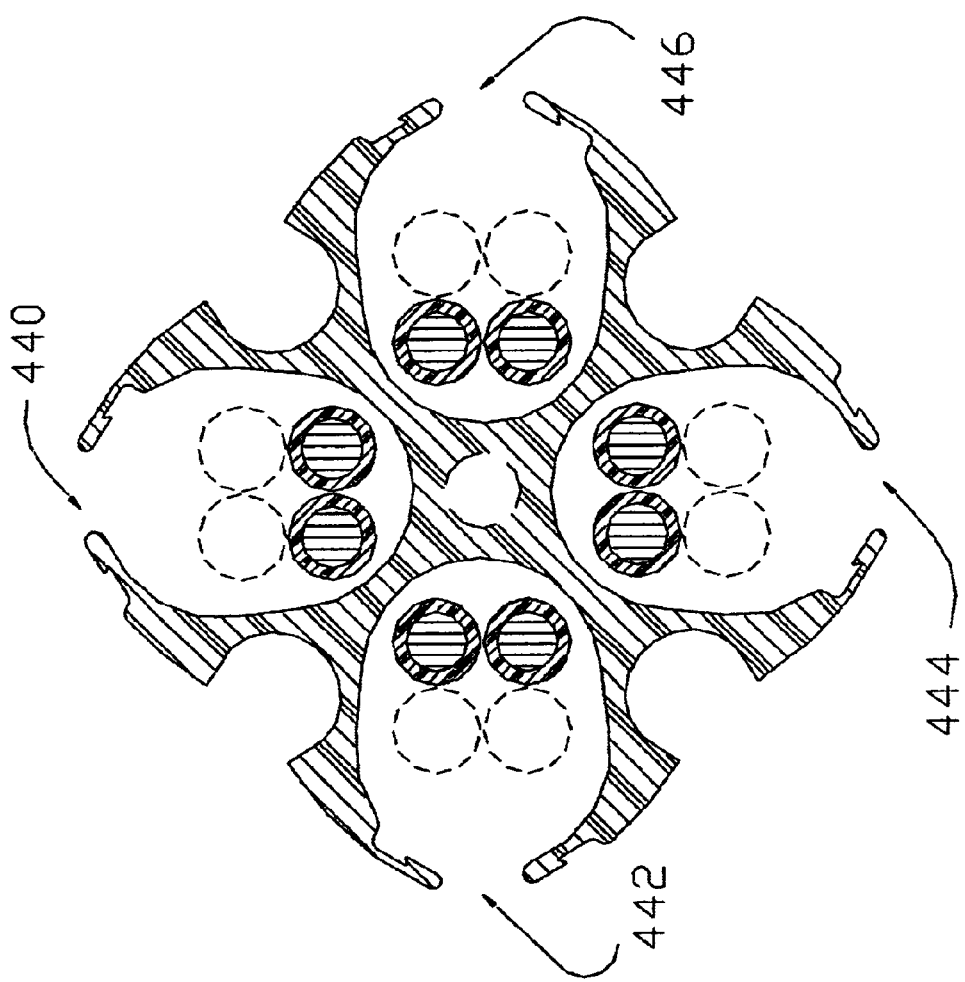
FIG. 4A is a cross-section of the double flap, flap-top embodiment of the interior support or anvil-shaped separator taken along the horizontal plane of the interior support or anvil-shaped separator when the flaps are open.
Figures 4B, 4C:
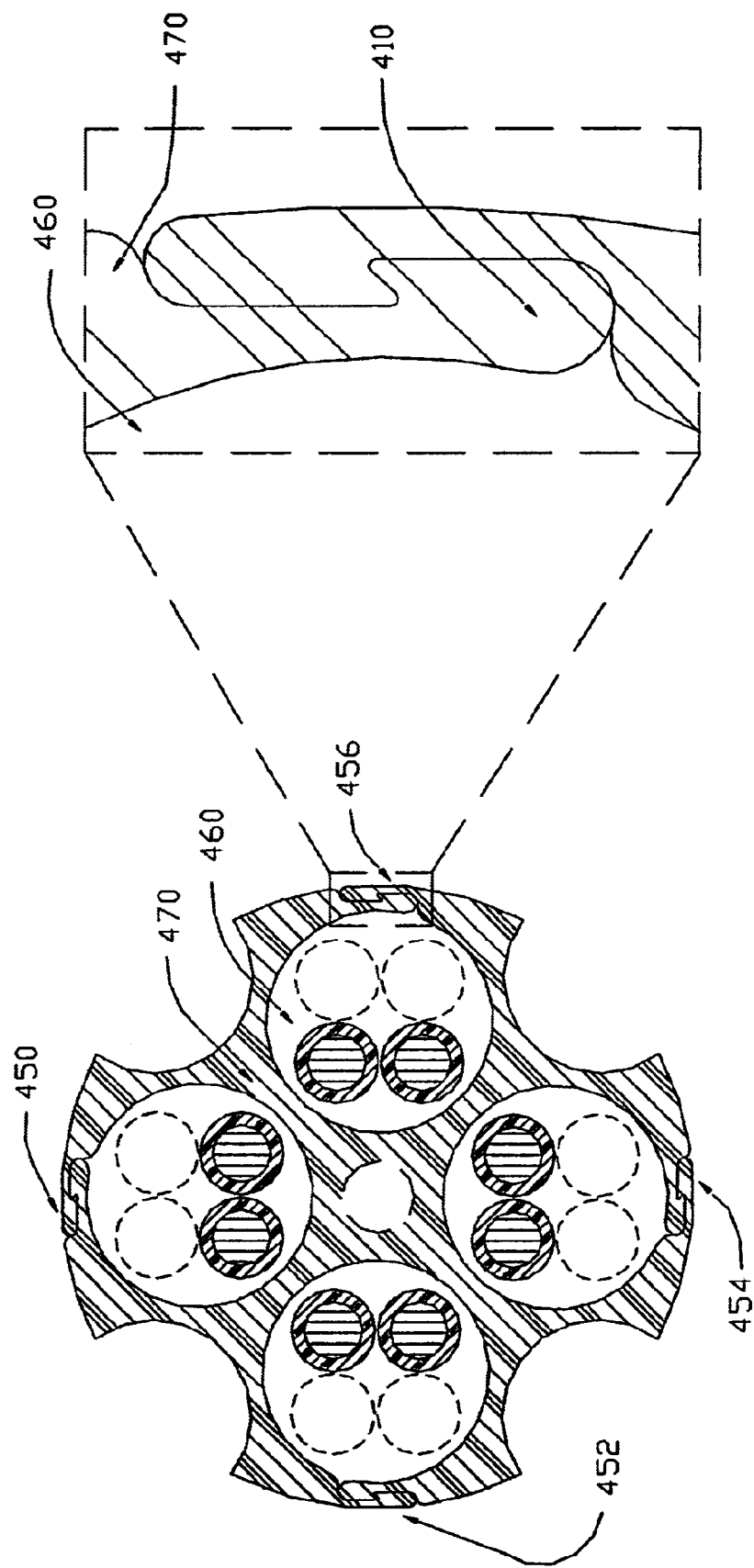
FIG. 4B is a cross-section of the double flap, flap-top embodiment of the interior support or anvil-shaped separator taken along the horizontal plane of the interior support or anvil-shaped separator when the flaps are closed.
FIG. 4C is an enlarged detailed version of the closed double-flap, flap-top embodiment of the anvil-shaped separator.

FIG. 4A is another embodiment of the anvil-shaped separator. The anvil-shaped separator includes double flap-tops (440, 442, 444, and 446) that are initially in an open position to allow the twisted pairs to be inserted into the channels. In FIG. 4B the flap-tops are in the closed position (450, 452, 454, and 456). The flap-tops are again self-sealing in the presence of heat and/or pressure and the channels containing the twisted pairs are subsequently enclosed. The flap top is shown in more detail in FIG. 4C. Another embodiment of FIG. 4 includes all of the aforementioned features of FIG. 4 without the drain wire or drain wire slot, but includes the center hole for strength members. A further embodiment of FIG. 4 includes all the aforementioned features of FIG. 4 without the center hole for strength members and without the drain wire or drain wire slot.

The single flap-tops of FIG. 3 (350 or 380 for example) and the double flap-top (440) enclose the wires or cables within channels created by the separator. During manufacturing, the flap-top is in the opened position and closes as either pressure or heat or both are applied (normally through a circular cavity during extrusion). Optionally, a second heating die may be used to ensure closure of the flap-top after initial extrusion of the separator or cable during manufacture. Another possibility is the use of a simple metal ring placed in a proper location that forces the flap-top down during final separator or cable assembly once the conductors have been properly inserted into the channels. The metal ring may be heated to induce proper closure. Other techniques may also be employed as the manufacturing process will vary based on separator and cable requirements (i.e. no. of conductors required, use of grounding wire, alignment within the channels, etc.). In one embodiment (FIG. 3C) the single flap-top (360) is secured to a recessed portion of one side of an opening of the cavity of the separator (365), and closure occurs when the unsecured, physically free end is adjoined to and adhered with the other end of the outer surface of the channel wall. In another embodiment the single flap-top (390) is secured by overlapping and adhering the unsecured end to the outer rounded end surface of the separator (395), thereby, enclosing the channel. The double-flap top arrangement requires that both flap-top ends physically meet and eventually touch to secure enclosure of the existing cavity (460) formed by the separator (470).

Figure 5:
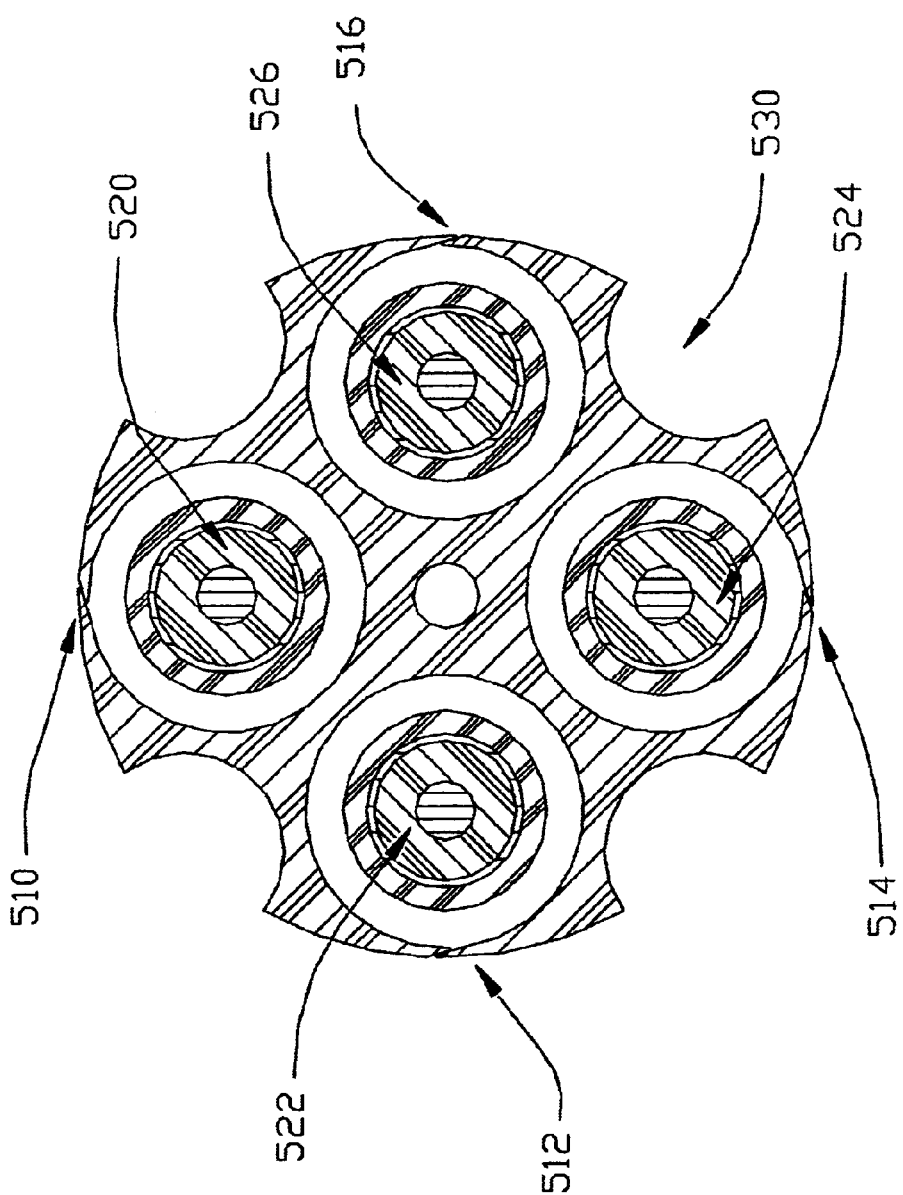
FIG. 5 is a cross-section of a flap-top embodiment of the interior support anvil-shaped separator taken along the horizontal plane of the interior support anvil-shaped separator where the separator contains one fiber in each of four channels.

FIG. 5 is a cross-section of another embodiment of the flap-top anvil-shaped separator. Each channel is enclosed by double flaps that can be sealed via heat and/or pressure (510, 512, 514, and 516). Each channel contains at least one fiber (520, 522, 524, and 526) that runs the length of the cable. More than one fiber may be included in each channel if necessary. The separator also includes a slot for a drain or earthing wire (530).

Figure 6A:
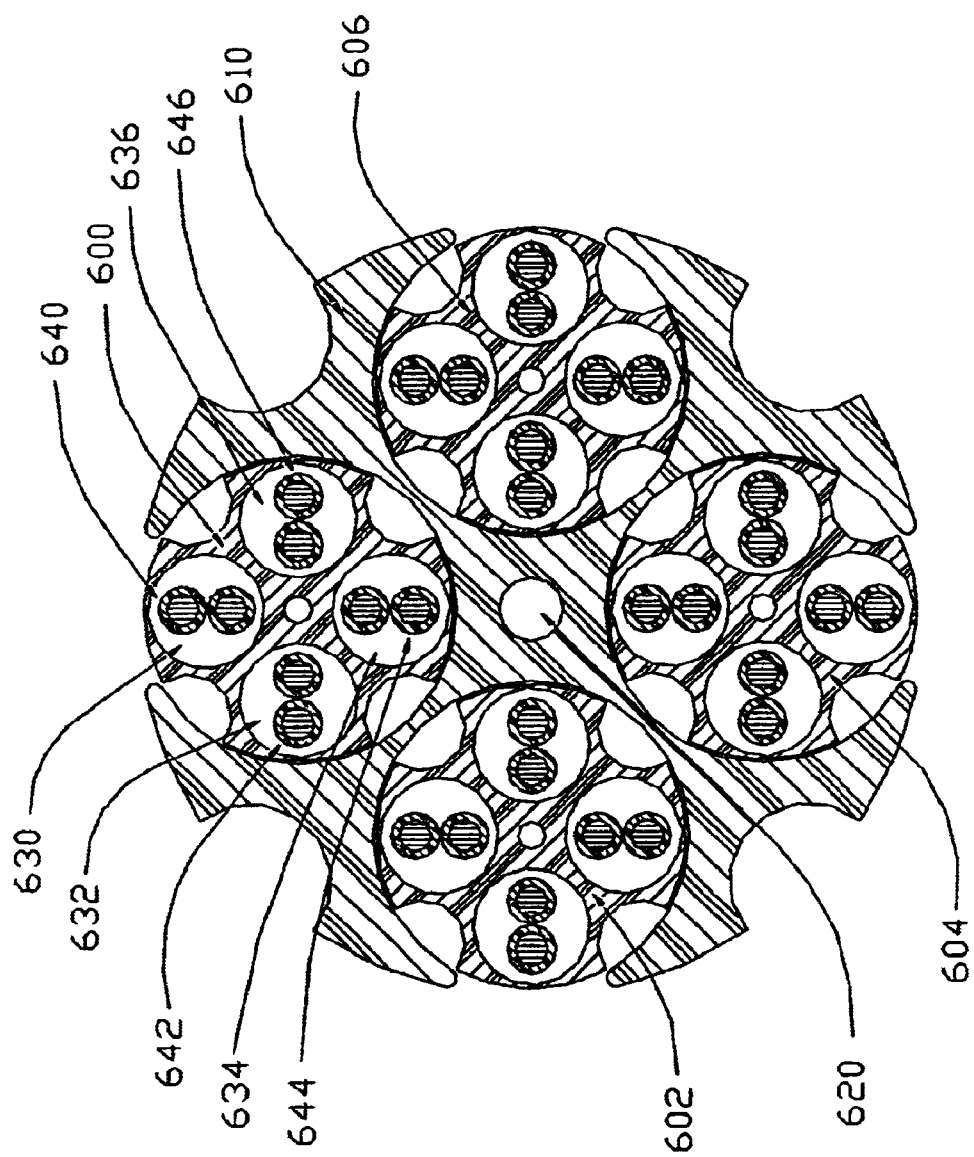
FIG. 6A is a cross-section of a cable containing four anvil-shaped separators taken along the horizontal plane of the cable.
Figures 6B, 6C:
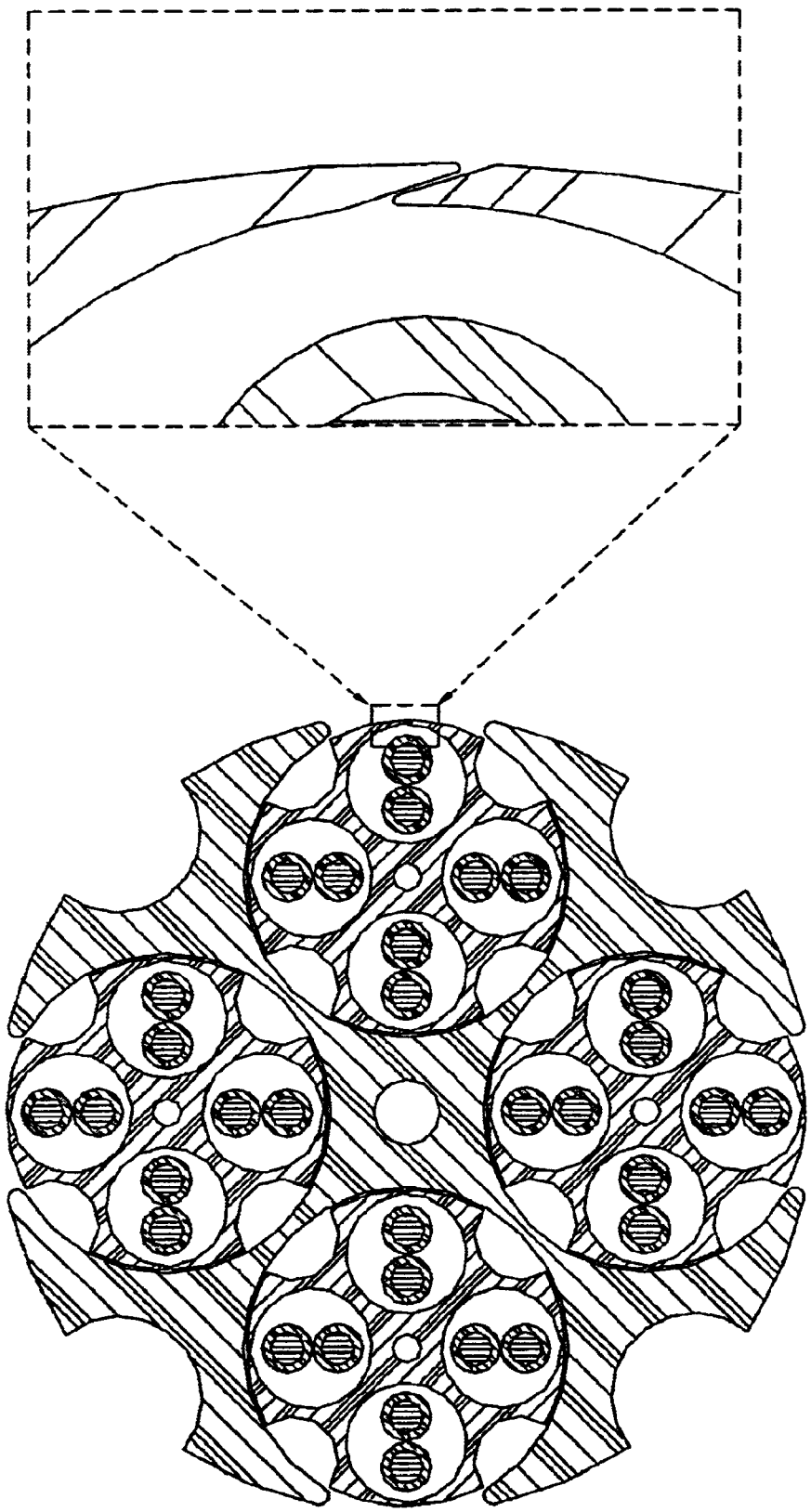
FIGS. 6B and 6C illustrate an enlarged detailed version of the closed double-flap, flap-top embodiment of the anvil-shaped separator for the cross-section of a cable containing four anvil-shaped separators taken along the horizontal plane of the cable.

FIG. 6A is a cross-section of a cable that contains four anvil-shaped separators (600, 602, 604, and 606) within a larger anvil-shaped separator (610). The larger separator contains a cavity in the center of the separator for a strength member (620). Each of the smaller separators contained within the larger anvil-shaped separator has four channels (630, 632, 634, and 636). As shown, each of these channels contains a twisted pair within this embodiment (640, 642, 644, and 646). This embodiment allows for a total of sixteen twisted pairs to be included in one cable. FIGS. 6B and 6C illustrate an enlargement a flaptop configuration used for each of the smaller anvil-shaped separators.

Figure 7:
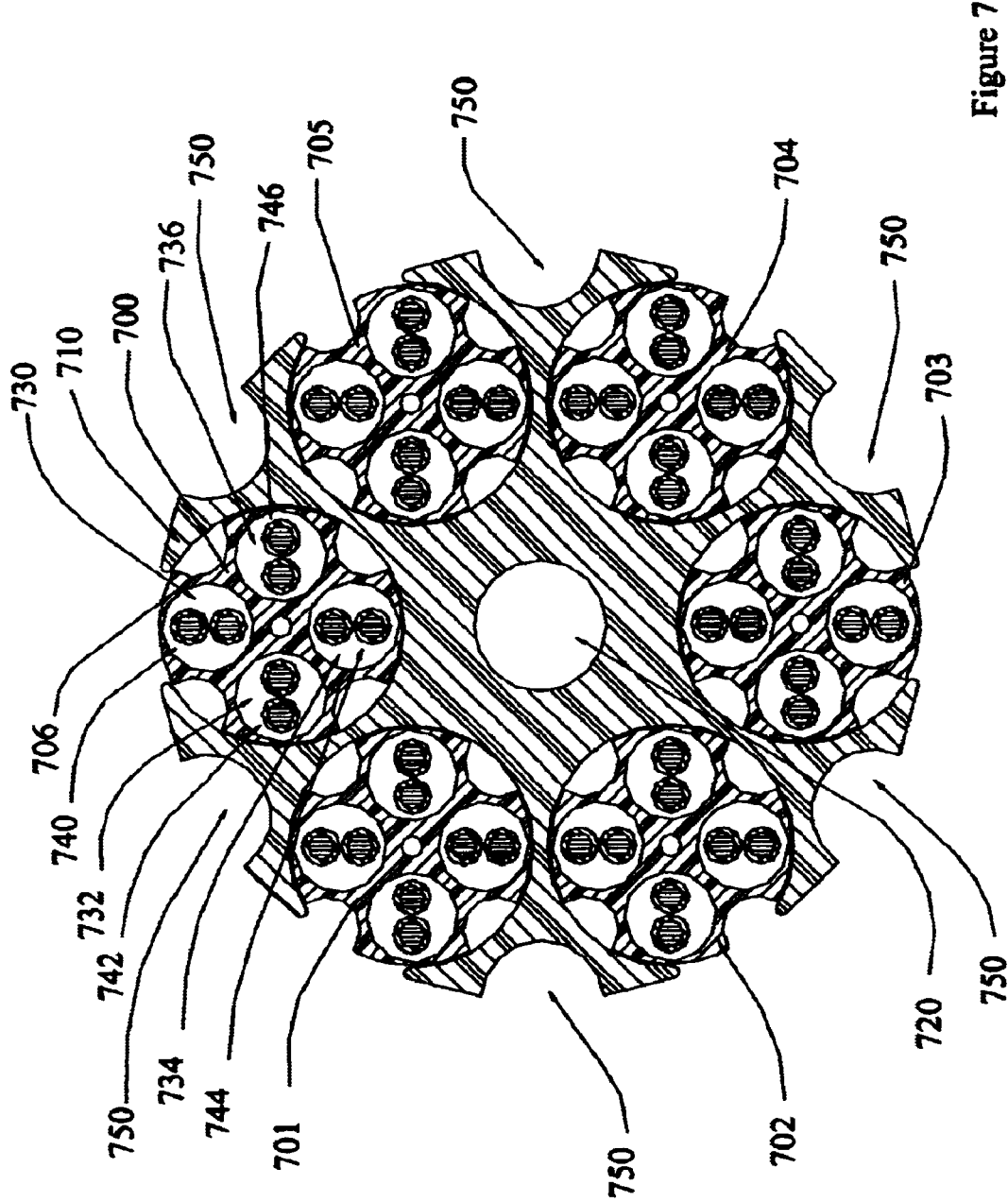
FIG. 7 is a cross-section of a cable containing six anvil-shaped separators taken along the horizontal plane of the cable.

FIG. 7A is a cross-section of a cable that contains six anvil-shaped separators (700, 701, 702, 703, 704, and 705) within a larger anvil-shaped separator (710). The larger separator contains a cavity in the center of the separator for a strength member (720). Each of the smaller separators contained within the larger anvil-shaped separator has four channels (730, 732, 734, and 736). Within each of these channels is one twisted pair (740, 742, 744, and 746). This embodiment allows sixteen twisted pairs to be included in one cable. FIG. 7a has the added feature of a wired slot (750) which can hold a 25–30$^{th}$ conductor pair.

Figure 8A:
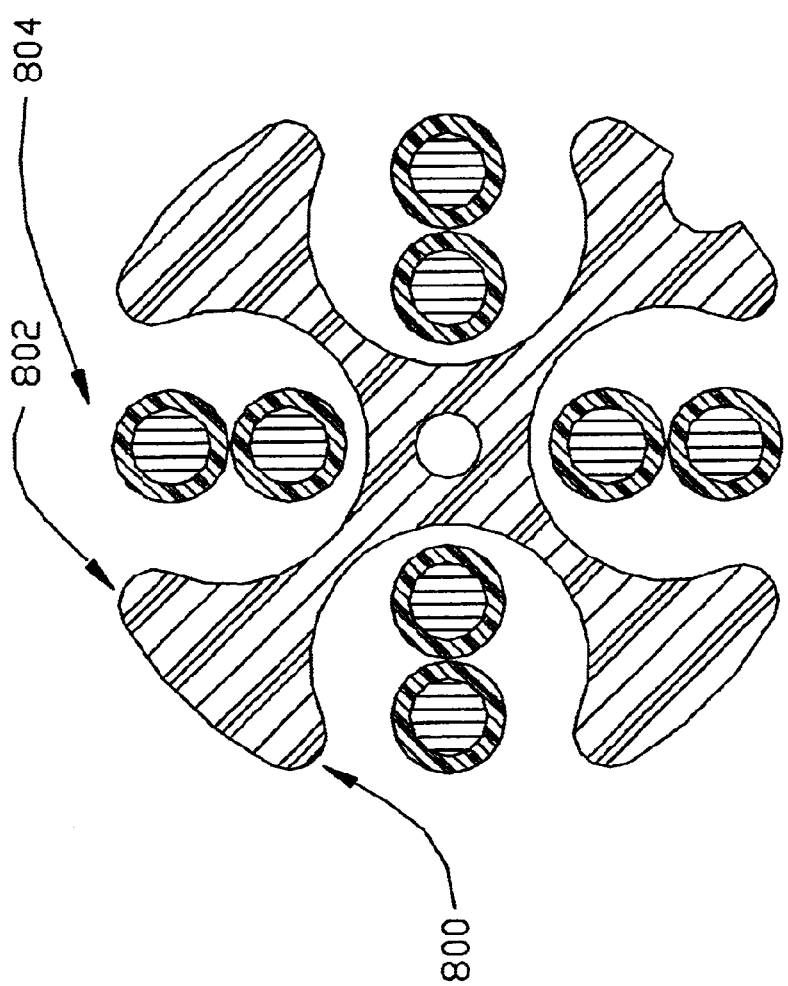
FIG. 8A is a cross-section of an anvil-shaped separator where both outer sharp edged ends of the anvil have been replaced with rounded regions to reduce weight and provide a larger opening for each channel defined by the anvil-shaped separator.
Figure 8B:
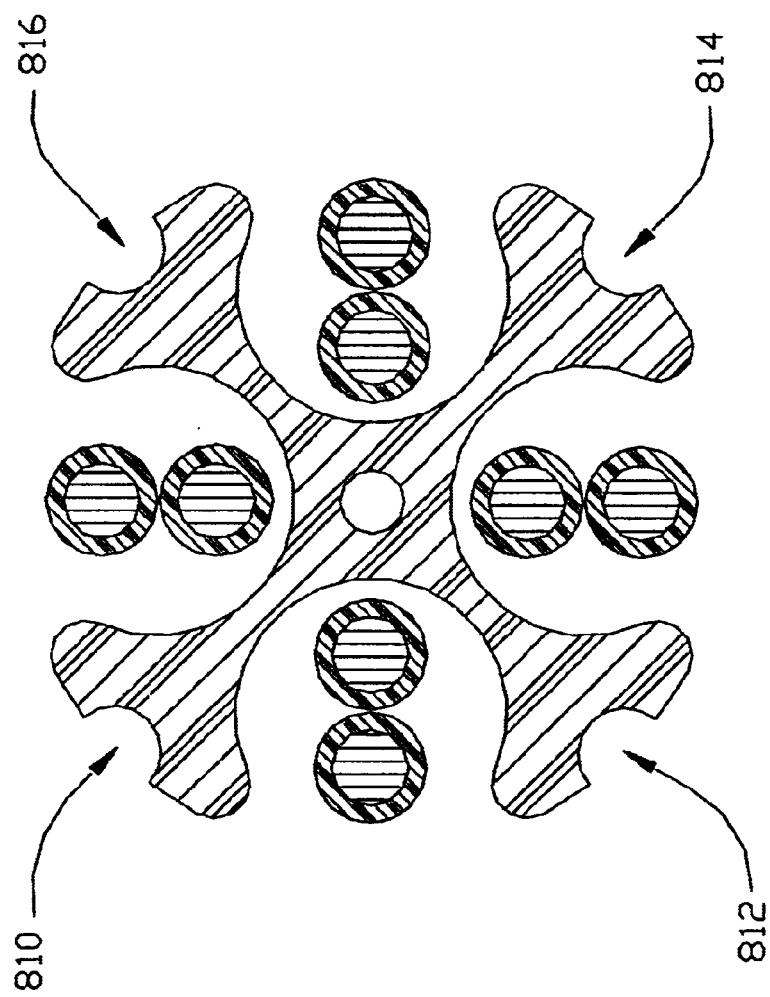
FIG. 8B is also a cross-section of an anvil-shaped separator where both outer sharp edged ends of each anvil section are replaced with rounded regions and each anvil section includes a channel for a drain wire.

FIGS. 8A and 8B depict a cross-section and additional embodiment of an anvil-shaped separator which has been substantially trimmed such that the each edged end of each anvil is removed (800 and 802) to reduce weight resulting in enlarged channel openings (804). FIG. 8B depicts the cross-section with optional drain wires within each solid and trimmed anvil section (810, 812, 814, and 816).

Figure 9A:
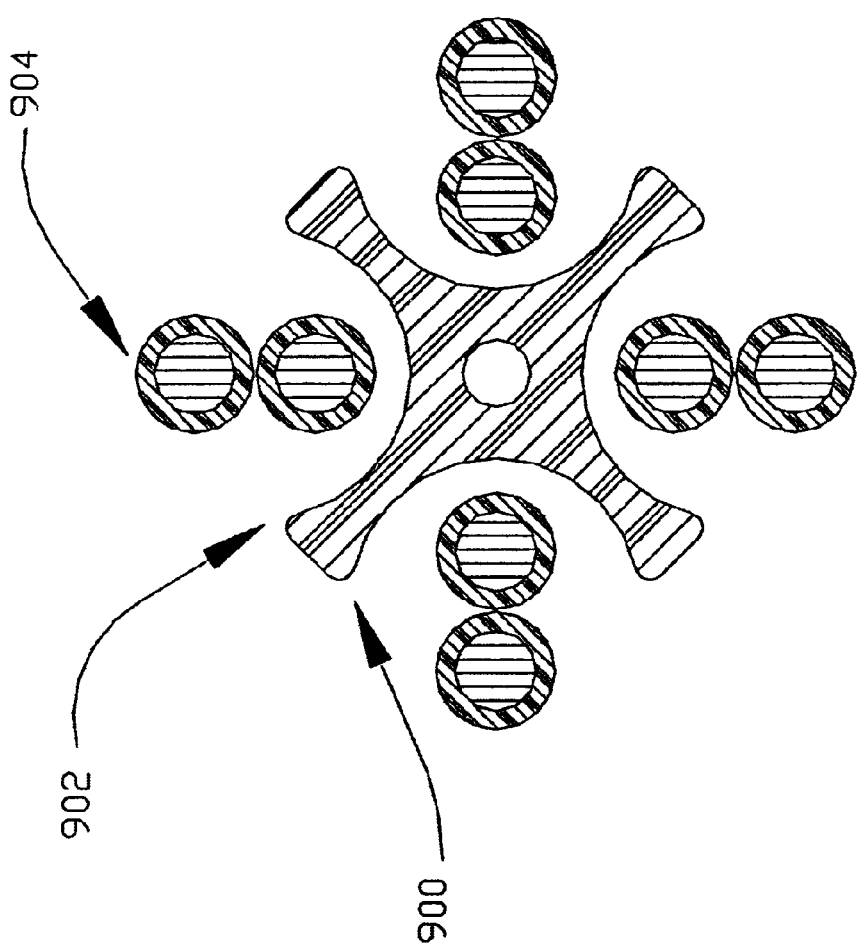
FIG. 9A is a cross-section of an anvil-shaped separator where dual lobed anvil sections are minimized in size to provide the greatest possible channel girth and opening while still maintaining an anvil-like shape.
Figure 9B:
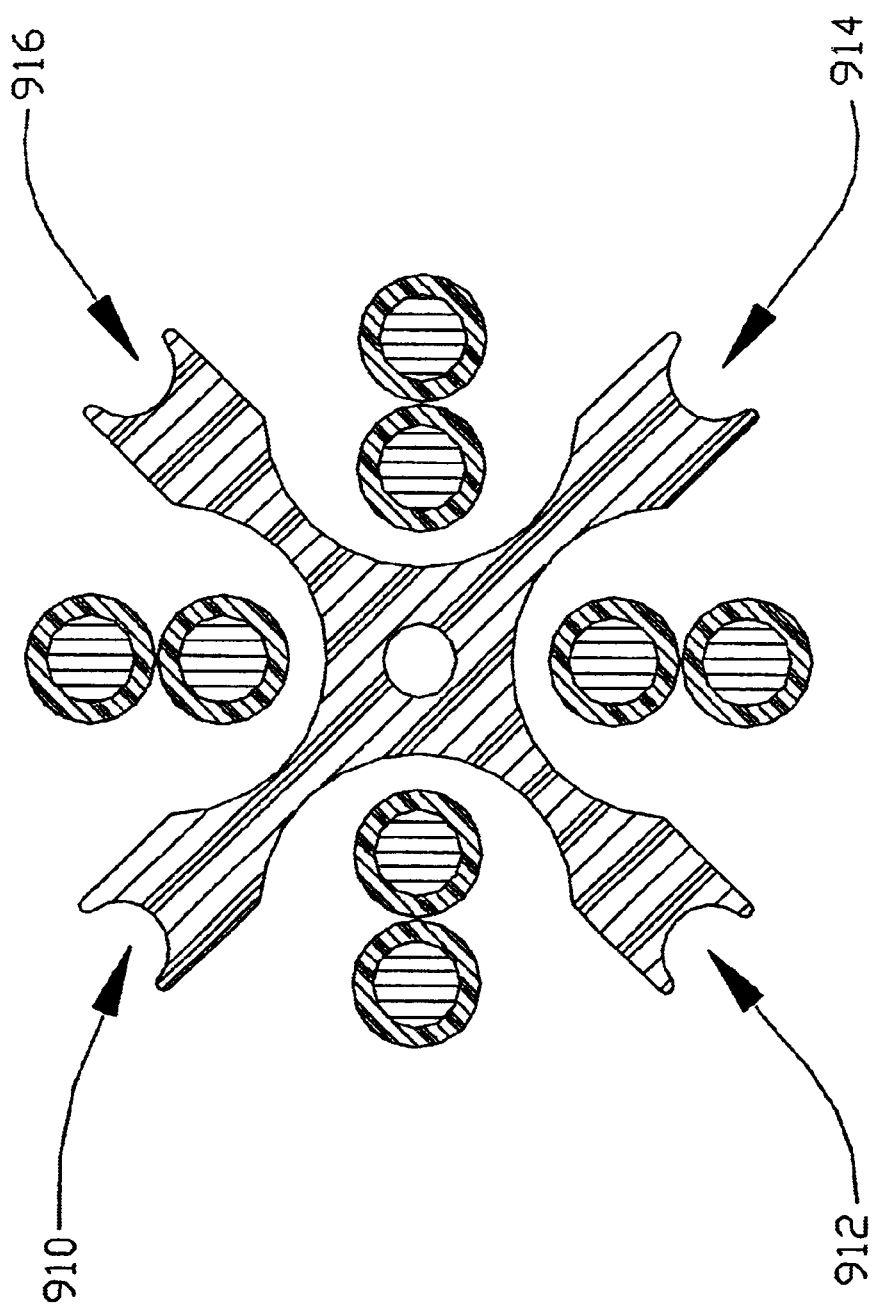
FIG. 9B is also a cross-section of an anvil-shaped separator where dual lobed anvil sections are minimized in size and each dual lobed section includes a channel for a drain wire.

FIGS. 9A and 9B are cross-sections and additional embodiments of a separator where the dual lobed ends of the anvil are minimized (900 and 902) such that an even further reduction in weight, enlarged channel openings (904) and enlarged channel girth are provided. FIG. 9B includes earthing or drain wire slots (910, 912, 914, and 916).

It will, of course, be appreciated that the embodiment which has just been described has been given simply by the way of illustration, and the invention is not limited to the precise embodiments described herein; various changes and modifications may be effected by one skilled in the art without departing from the scope or spirit of the invention as defined in the appended claims.

What is claimed is:

1. A high performance communications cable comprising; an interior support with an external radial and axial surface extending along a longitudinal length of said communications cable, said interior support also having a central region, said central region also extending along a longitudinal length of said interior support and said communications cable; said interior support comprising at least one anvil shaped core support-separator section radially and axially defined by said central region; each of said anvil shaped core support-separator sections defining one or more clearance channels that also extend along said longitudinal length of both said at least one anvil shaped core support-separator sections and said communications cable and; each of said anvil-shaped core support-separator sections comprise clearance walls of said one or more clearance channels defined by a circular geometry that include a flap-top allowing for opening or closing said exterior radial and axial surfaces of said channel walls of said one or more clearance channels.

2. The high performance communications cable of claim 1, wherein said interior support, said central region, and said anvil shaped core support-separator sections comprise solid, partially solid, or foamed or inorganic dielectric materials.

3. The high performance communications cable of claim 1, wherein said interior support, said central region, and said anvil shaped core support-separator sections comprises solid, partially solid, or foamed thermoplastic or thermosetting dielectric materials.

4. The high performance communications cable of claim 1, wherein said interior support comprises a center portion, wherein said center portion of said interior support is hollow along said longitudinal length of said communications cable.

5. The high performance communications cable of claim 1, wherein each of said anvil-shaped core support-separator sections comprises clearance walls that are defined by a semi-closed semi-circular geometry such that there remains less than a 160 degree opening along said exterior radial and axial surface, but more than a 10 degree opening along said external surface of said interior support of said one or more clearance channels.

6. The high performance communications cable of claim 1, wherein said flap-top is comprised of a press-fit arrangement that is hinged allowing for opening and closing said exterior radial and axial surfaces of said channel walls of said one or more clearance channels.

7. The high performance communications cable of claim 6, wherein said flap-top is sealed by use of heat, tape, interlocking, or by skin extrusion of said hinged press-fit arrangement,.

8. The high performance communications cable of claim 1, wherein each of said anvil-shaped core support-separator sections comprises clearance walls defined by a fully closed circular geometry that includes an interlocking double flap-top, where said double flap-top is adhered to or adjoined with a surface on each side of said clearance walls for opening or closing said exterior radial and axial surfaces of said channel walls of said one or more clearance channels.

9. The high performance communications cable of claim 1, wherein said double flap-top is comprised of a press-fit arrangement on each end that may remain in an opened or closed position for said exterior radial and axial surfaces of said channel walls of said one or more clearance channels.

10. The high performance communications cable of claim 1, wherein said channel walls comprise interior surfaces that are corrugated including internal axial grooves separated by a sufficient distance such that individual conductors or conductor pairs maintain required electrical integrity and such that said conductor or conductor pairs are optionally forced against an edge of said grooves or sections of said channel walls.

11. The high performance communications cable of claim 1, wherein said channel walls comprise interior surfaces that are corrugated including internal axial grooves separated by a sufficient distance such that individual conductors or conductor pairs forced into said grooves maintain required electrical integrity.

12. The high performance communications cable of claim 1, wherein said interior support comprises a corrugated or convoluted external radial and axial surface extending along a longitudinal length of said communications cable, such that external surfaces of said anvil shaped core-support sections include external radial grooves also extending along said longitudinal length of said support such that said interior support can itself function as a cable jacket for said communications cable.

13. The high performance communications cable of claim 1, wherein each of said anvil shaped core-support sections are optionally singularly filled with individual or paired metal electrical transmitting conductors or optical fiber light transmitting conductors, or filled with a combination of said individually or paired metal or optical conductors along said longitudinal length of said support and said cable.

14. The high performance communications cable of claim 1, wherein said interior support is defined by a circumference of between 0.100 and 0.700 inches and wherein said one or more clearance channel diameters are preferably defined by a diameter of 0.060 to 0.100 inches to specifically accommodate in the range between 22 and 26 AWG paired metal conductors with insulation.

15. The high performance communications cable of claim 14, wherein said paired metal conductors are copper.

16. The high performance communications cable of claim 1, wherein said cable comprises an axial strength member wherein said axial strength member optionally lies parallel to said interior support inside said communications cable jacket along said longitudinal direction of said support and said cable.

17. The high performance communications cable of claim 1, wherein said multi-anvil shaped separator sections comprises an optional slotted section distinct from said support-separator sections that is sufficient to contain a ground wire with an optional shielding tape.

18. An interior support-separator for a communications cable extending along a longitudinal length of said communications cable, comprising; an external radial and axial surface, said interior support having a central region, said central region also extending along a longitudinal length of said interior support; said interior support comprising at least one anvil shaped core support-separator section radially and axially defined by said central region; each of said anvil shaped core support-separator sections defining one or more clearance channels that also extend along said longitudinal length of said at least one anvil shaped core support-separator sections and; each of said anvil-shaped core support-separator sections comprise clearance walls of said one or more clearance channels defined by a circular geometry that includes a flap-top allowing for opening or closing said exterior radial and axial surfaces of said channel walls of said one or more clearance channels.

19. The interior support of claim 18, wherein said interior support, said central region, and said anvil shaped core support-separator sections comprises solid, partially solid, or foamed thermoplastic dielectric materials.

20. The interior support of claim 18, wherein said interior support comprises a center portion, wherein said center portion of said interior support may be hollow along said longitudinal length of said communications cable.

21. The interior support of claim 18, wherein each of said anvil-shaped core support-separator sections comprises clearance walls defined by a semi-closed semi-circular geometry such that there remains less than a 160 degree opening along said exterior radial and axial surface, but more than a 10 degree opening along said external surface of said interior support, typically said opening of said channel is between 0.005 and 0.011 inches.

22. The interior support of claim 18, wherein each of said anvil-shaped core support-separator sections comprises clearance walls defined by a fully closed circular geometry that remain closed but optionally includes an optionally interlocking flap-top for opening or closing said exterior radial and axial surfaces of said channel walls of said one or more clearance channels.

23. The interior support of claim 18, wherein said flap-top is comprised of a press-fit arrangement that may remain in an opened or closed position for said exterior radial and axial surfaces of said channel walls of said one or more clearance channels.

24. The interior support of claim 23, wherein said flat top is sealed by use of heat, tape, or interlocking of said hinged press-fit arrangement.

25. The interior support of claim 18, wherein each of said anvil-shaped core support-separator sections comprises clearance walls defined by a fully closed circular geometry that remain closed but optionally includes an interlocking double flap-top, where said double flap-top is adhered to or adjoined with a surface on each side of said clearance walls for opening or closing said exterior radial and axial surfaces of said channel walls of said one or more clearance channels.

26. The interior support of claim 25, wherein said double flap-top is comprised of a press-fit arrangement on each end that may remain in an opened or closed position for said exterior radial and axial surfaces of said channel walls of said one or more clearance channels.

27. The interior support of claim 25, wherein said double flap-top is sealed by use of heat, tape, or interlocking of said hinged press-fit arrangement.

28. The interior support of claim 18, wherein said channel walls comprise interior surfaces that are corrugated including internal axial grooves separated by a sufficient distance such that individual conductors or conductor pairs maintain required electrical integrity and such that said conductor or conductor pairs are optionally forced against an edge of said grooves or sections of said channel walls.

29. The interior support of claim 18, wherein said channel walls comprise interior surfaces that are ribbed including internal radial grooves separated by a sufficient distance such that individual conductors or conductor pairs maintain required electrical integrity.

30. The interior support of claim 18, wherein said interior support comprises a corrugated or convoluted external radial and axial surface extending along a longitudinal length such that external surfaces of said anvil shaped core-support sections include external radial grooves also extending along said longitudinal length of said support such that said interior support itself functions as a cable jacket.

31. The interior support of claim 30, wherein said interior support is defined by a circumference of between 0.100 and 0.700 inches and wherein said one or more clearance channels are preferably defined by a diameter of between 0.060 and 0.100 inches to specifically accommodate in the range between 22 and 26 AWG paired metal conductors with insulation.

32. The interior support of claim 31, wherein said paired metal conductors are copper.

33. The interior support of claim 32, wherein said paired metal conductors are aluminum.

34. The interior support of claim 18, wherein each of said anvil-shaped core-support sections are optionally singularly filled with individual or paired metal electrical transmitting conductors or optical fiber light transmitting conductors, or filled with a combination of said individually or paired metal or optical conductors along said longitudinal length of said support.

35. The interior support of claim 18, wherein said at least one anvil shaped support-separator section comprise an optional slotted section distinct from said support-separator sections that is sufficient to contain a grounding wire.

36. The interior support of claim 18, wherein said anvil shaped support-separator sections comprise rounded edges of said anvil shaped supports at an outer radial end of said anvil shaped sections sufficient to reduce overall weight and size of said support-separator and subsequently said cable.

37. The interior support of claim 18, wherein said anvil shaped support-separator sections comprise minimized dual lobes at an outer radial end of said multi-anvil shaped sections sufficient to minimize and reduce overall weight and size of said support-separator and subsequently said cable.

38. An interior support-separator for a communications cable assembly extending along a longitudinal length of said communications cable, comprising; an external radial and axial surface, said interior support-separator having a central region, said central region also extending along a longitudinal length of said interior support; said interior support comprising at least one anvil shaped core support-separator section radially and axially defined by said central region; each of said anvil shaped core support-separator sections defining one or more clearance channels that also extend along said longitudinal length of said anvil shaped core support-separator sections, and; each of said anvil-shaped core support-separator sections comprise clearance walls of said one or more clearance channels defined by a circular geometry that includes a flap-top allowing for opening or closing said exterior radial and axial surfaces of said channel walls of said one or more clearance channels wherein said anvil shaped core support-separator sections are themselves twisted to a specified lay length.

39. An interior support of claim 38, providing a specified lay length by implementing a twisting of said clearance channels thereby providing said lay length twist into said support-separator prior to manufacturing said final communications cable assembly.

40. An interior support of claim 38, providing a specified lay length by implementing a twisting of said clearance channels thereby providing said lay length twist into said support-separator during manufacturing of said final communications cable assembly.

41. A method for producing a high performance communications cable by introducing an interior anvil-shaped core support-separator section or sections with an external radial and axial surface with a longitudinal length, said external radial and axial surfaces having a central region extending along a longitudinal length of an interior support with one or more clearance channels and; each of said anvil-shaped core support-separator sections comprise clearance walls of said one or more clearance channels defined by a circular geometry that includes a flap-top allowing for opening or closing said exterior radial and axial surfaces of said channel walls of said one or more clearance channels into a jacket of said cable by;

passing a plurality of transmission conductors within said one or more clearance channels of said interior support-separator through a first die that aligns the plurality of transmission conductors with surface features of said internal support allowing for intentional twisting of said conductors, forcing each of said plurality of conductors into a proper clearance channel of said interior support-separator where said one or more clearance channels are optionally closed by single or double flap-tops, thereby maintaining a spatial relationship between each of said transmission conductors by use of a second die, heating said second die allowing for closing of said exterior surface of said one or more clearance channels, taping and twisting said interior support allowing for closing of said exterior surface of said one or more clearance channels, and;

jacketing said interior support containing each of said conductors within said one or more clearance channels.

42. The method of producing a cable of claim 41, by omitting the step of heating.

43. The method of producing a cable of claim 41, by omitting the use of a second die.

44. The method of producing a cable of claim 41, by including the use of a metal ring for forcing said conductors into a proper clearance channel and forcing closure of said flap-tops.

45. The method of producing a cable of claim 41, by omitting the step of taping and twisting.

46. The method of producing a cable of claim 41, by omitting the step of jacketing.

* * * * *